US012531372B2

(12) United States Patent
Wang et al.

(10) Patent No.: US 12,531,372 B2
(45) Date of Patent: Jan. 20, 2026

(54) ELECTRICAL CONNECTOR AND IN-VEHICLE ELECTRONIC DEVICE

(71) Applicant: SHANGHAI•AEROSPACE•SCIENCE & INDUSTRY•APPLIANCE•CO., LTD., Shanghai (CN)

(72) Inventors: Xu Wang, Shanghai (CN); Zuotao Zou, Shanghai (CN); Jian Wang, Shanghai (CN); Jun Wang, Shanghai (CN)

(73) Assignee: SHANGHAI•AEROSPACE•SCIENCE & INDUSTRY•APPLIANCE•CO., LTD., Shanghai (CN)

( * ) Notice: Subject to any disclaimer, the term of this patent is extended or adjusted under 35 U.S.C. 154(b) by 376 days.

(21) Appl. No.: 18/247,623

(22) PCT Filed: Jul. 29, 2021

(86) PCT No.: PCT/CN2021/109243
§ 371 (c)(1),
(2) Date: Mar. 31, 2023

(87) PCT Pub. No.: WO2022/252376
PCT Pub. Date: Dec. 8, 2022

(65) Prior Publication Data

US 2023/0318226 A1 Oct. 5, 2023

(30) Foreign Application Priority Data

May 31, 2021 (CN) ......................... 202110603372.3

(51) Int. Cl.
*H01R 12/71* (2011.01)
*H01R 12/70* (2011.01)
(Continued)

(52) U.S. Cl.
CPC ..... *H01R 13/6315* (2013.01); *H01R 12/7088* (2013.01); *H01R 12/716* (2013.01);
(Continued)

(58) Field of Classification Search
CPC ............ H01R 13/6315; H01R 12/7088; H01R 12/716; H01R 13/04; H01R 13/11;
(Continued)

(56) References Cited

U.S. PATENT DOCUMENTS 10,971,839 B1 * 4/2021 Kuo ..................... H01R 12/724
11,552,419 B2 * 1/2023 Obata .................... H01R 12/91
(Continued)

FOREIGN PATENT DOCUMENTS

CN 202906016 U 4/2013
CN 104283067 A 1/2015
(Continued)

OTHER PUBLICATIONS

First Office Action received corresponding Application No. CN 202110603372.3, dated Apr. 27, 2022, 9 pages.
(Continued)

*Primary Examiner* — Abdullah A Riyami
*Assistant Examiner* — Nelson R. Burgos-Guntin
(74) *Attorney, Agent, or Firm* — Dority & Manning, PA

(57) ABSTRACT

An electrical connector includes a plug connector and a socket connector that are connected in a detachable and floating manner, two sets of socket signal conductors being arranged in a misaligned manner, and a socket grounding conductor being fixed onto a lower socket housing and connected to part of socket signal conductor structures in each set of socket signal conductor. An upper socket housing is mounted onto the lower socket housing through an insertion connection. Two sets of plug signal conductors of the plug connector are arranged in a misaligned manner, and
(Continued)

the plug signal conductor structures in the two sets of plug signal conductors and the socket signal conductor structures in the two sets of socket signal conductors are in one-to-one correspondence.

20 Claims, 14 Drawing Sheets

(51) Int. Cl.
*H01R 13/04* (2006.01)
*H01R 13/11* (2006.01)
*H01R 13/631* (2006.01)
*H01R 13/6461* (2011.01)

(52) U.S. Cl.
CPC ............. *H01R 13/04* (2013.01); *H01R 13/11* (2013.01); *H01R 13/6461* (2013.01); *H01R 2201/26* (2013.01)

(58) Field of Classification Search
CPC ............ H01R 13/6461; H01R 2201/26; H01R 12/737; H01R 12/707; H01R 13/41; H01R 31/08; H01R 12/91; H01R 24/60; H01R 13/533; H01R 24/005; Y02T 10/70
See application file for complete search history.

(56) References Cited

U.S. PATENT DOCUMENTS

| | | | | |
|---|---|---|---|---|
| 2017/0033480 | A1* | 2/2017 | Sato | H01R 12/716 |
| 2019/0131731 | A1 | 5/2019 | Lee et al. | |
| 2019/0214772 | A1 | 7/2019 | Kodama | |
| 2020/0119493 | A1* | 4/2020 | Mitter | H01R 13/6315 |

FOREIGN PATENT DOCUMENTS

| | | | |
|---|---|---|---|
| CN | 207442027 | U | 6/2018 |
| CN | 210668799 | U | 6/2020 |
| CN | 210957070 | U | 7/2020 |
| CN | 211629359 | U | 10/2020 |
| CN | 112272903 | A | 1/2021 |
| CN | 112615176 | A | 4/2021 |
| CN | 112636113 | A | 4/2021 |
| JP | 2002093502 | A | 3/2002 |
| JP | 2012129109 | A | 7/2012 |
| JP | 2014160619 | A | 9/2014 |
| JP | 2016115488 | A | 6/2016 |
| JP | 2021022488 | A | 2/2021 |
| JP | 2021163541 | A | 10/2021 |
| JP | 2021190255 | A | 12/2021 |
| TW | M556028 | U | 2/2018 |
| WO | WO2016042625 | A1 | 3/2016 |

OTHER PUBLICATIONS

International Search Report and Written Opinion (with English translation) for PCT/CN2021/109243, mailed on Jan. 26, 2022, 14 pages.
Second Office Action received in corresponding Application No. CN 202110603372.3, dated Dec. 5, 2022, 8 pages.
Extended European Search Report for corresponding Application No. 21943732.4, dated Aug. 23, 2024, 20 pages.
Japanese Notice of Allowance (w/ English translation) for corresponding Application No. 2023-524735, dated Aug. 27, 2024, 4 pages.
Japanese Office Action (w/ English translation) for corresponding Application No. 2023524664, dated Feb. 13, 2024, 7 pages.
Japanese Office Action (w/ English translation) for corresponding Application No. 2023524735, dated Apr. 16, 2024, 8 pages.

* cited by examiner

ELECTRICAL CONNECTOR AND IN-VEHICLE ELECTRONIC DEVICE

CROSS-REFERENCE TO RELATED APPLICATIONS

The present application is a national stage application of PCT international application PCT/CN2021/109243 filed on Jul. 29, 2021, which claims priority to Chinese patent application No. 2021106033723 filed with the Chinese Patent Office on May 31, 2021, entitled "ELECTRICAL CONNECTOR AND IN-VEHICLE ELECTRONIC DEVICE", the entire contents of which are incorporated by reference.

TECHNICAL FIELD

The present application relates to the floating board-to-board connection technology, and in particular, to an electrical connector and an in-vehicle electronic device.

BACKGROUND

A board-to-board connector is a micro-coupled plug and socket that can directly connect power and signals between printed circuit boards through pins of the connector. With the rapid development of electronic products, board-to-board connectors are widely used in many fields such as consumer, industrial control, automotive, medical, communication, etc. With the development of miniaturization and integration of electronic devices in these fields, more and more functional modules are integrated into a limited space. As a result, the application environment for these functional modules is becoming more and more complex, often containing a high temperature, a complex vibration environment, a large manufacturing error environment, etc. When different circuit boards implement power or signals intercommunication, the complex application environment often cause the connector conductor to be subjected to more strength and stress than the connector material itself can withstand, which may cause a transient interruption of the electrical signal of the connector or a degradation or destruction of the performance of the connector material itself of the connector. In the floating board-to-board connection field, in addition to the complex and changing application scenarios and multi-module integration, a development trend of the electronic products also presents a phenomenon that the used signals are developing to 10 Gbps or even higher frequencies, which requires a higher transmission speed for the connector in connection scenarios using the board-to-board connector. In other words, the connector transmission speed of the board-to-board connector in the connection scenario has also become one of the important factors for the system to realize its functions.

SUMMARY

According to various embodiments of the present application, it is necessary to provide an electrical connector and an in-vehicle electronic device.

An electrical connector includes a plug connector and a socket connector which are connected in a floating and detachable manner. The socket connector includes an upper socket housing, a lower socket housing, a socket grounding conductor, two sets of socket signal conductors and two sets of socket power conductors. The two sets of the socket signal conductors are arranged in a misaligned manner. Each set of the socket signal conductor includes a plurality of socket signal conductor structures. Each socket signal conductor structure includes at least one socket signal mounting interference portion. Each socket power conductor includes at least one socket power mounting interference portion. The lower socket housing is snap-mounted onto each of the socket signal mounting interference portions and each of the socket power mounting interference portions. The socket grounding conductor is fixed onto the lower socket housing and connected to part of the socket signal conductor structures of each set of the socket signal conductor. The upper socket housing is mounted onto the lower socket housing through an insertion connection. Two sets of plug signal conductors of the plug connector are also arranged in a misaligned manner, and the plug signal conductor structures of the two sets of the plug signal conductors and the socket signal conductor structures of the two sets of the socket signal conductors are in one-to-one correspondence for achieving an electrical contact when the plug connector is connected to the socket connector.

In one of the embodiments, the socket connector further includes two socket welding reinforcement legs. The socket welding reinforcement legs are provided at two ends of the lower socket housing respectively, and the socket welding reinforcement legs fixedly snap to the upper socket housing.

In one of the embodiments, in the two sets of the socket signal conductors arranged in the misaligned manner, along an extension direction of the socket grounding conductor, a misalignment distance L1 between the first socket signal conductor structure in one set of the socket signal conductor and the first socket signal conductor structure in the other set of the socket signal conductor is greater than or equal to a spacing L2 or a center-to-center spacing L3 of the socket signal conductor structures in a same set.

In one of the embodiments, for the socket signal conductor structures in each set of the socket signal conductor, every third socket signal conductor structure is connected to the socket grounding conductor.

In one of the embodiments, each set of the socket power conductor includes at least two socket power conductor structures. Each of the socket power conductor structures includes at least one socket power mounting interference portion. The socket signal conductor structures and the socket power conductor structures each include a middle bending portion, and the middle bending portion is bent toward a plug signal conductor structure or a plug power conductor of the plug connector.

In one of the embodiments, the socket conductor structure includes a welding leg portion for welding to an external circuit board, the middle bending portion having an R shape, and a sliding insertion portion for conducting with the plug connector.

In one of the embodiments, the middle bending portion is floated in an internal space enclosed by the upper socket housing and the lower socket housing.

In one of the embodiments, the plug connector further includes a plug housing, a plug grounding conductor, and two sets of plug power conductors. Each of the plug signal conductor structures includes at least one plug signal conductor interference portion. Each of the plug power conductor includes at least one plug power conductor interference portion. The plug housing is snap-mounted onto each of the plug signal conductor interference portions and each of the plug power conductor interference portions. The plug grounding conductor is fixed onto the plug housing and is connected to part of the plug signal conductor structures in each set of the plug signal conductor.

In one of the embodiments, the plug connector further includes plug welding reinforcement legs, and the plug welding reinforcement legs are detachably arranged on the plug housing.

In one of the embodiments, the plug signal conductor structure includes at least one width or thickness adjusting portion adjacent to or away from the plug signal conductor interference portion.

In one of the embodiments, the socket signal conductor structure further includes at least one width or thickness adjusting portion adjacent to or away from the socket signal mounting interference portion.

In one of the embodiments, the plug signal conductor structure includes a signal conductor welding leg portion, an elastic deformation portion, and a signal conductor positioning protrusion located between the signal conductor welding leg portion and the elastic deformation portion. The elastic deformation portion is configured to elastically abut against a corresponding socket signal conductor structure when the plug connector is connected to the socket connector to achieve the electrical contact. The signal conductor positioning protrusion is configured to abut against a plug grounding end of the plug grounding conductor or the plug housing.

In one of the embodiments, the plug signal conductor structure further includes a signal conductor first interference portion, a signal conductor second interference portion, a signal conductor third interference portion, and a signal conductor fourth interference portion to cooperatively mount and fix the plug housing.

In one of the embodiments, the two sets of the plug power conductors respectively abut against with the two sets of the socket power conductors, and the two sets of the plug signal conductors respectively abut against the two sets of the socket signal conductors.

In one of the embodiments, an in-vehicle electronic device includes the electrical connector as described in any one of the embodiments.

DETAILED DESCRIPTION OF THE EMBODIMENTS

Figure 1:
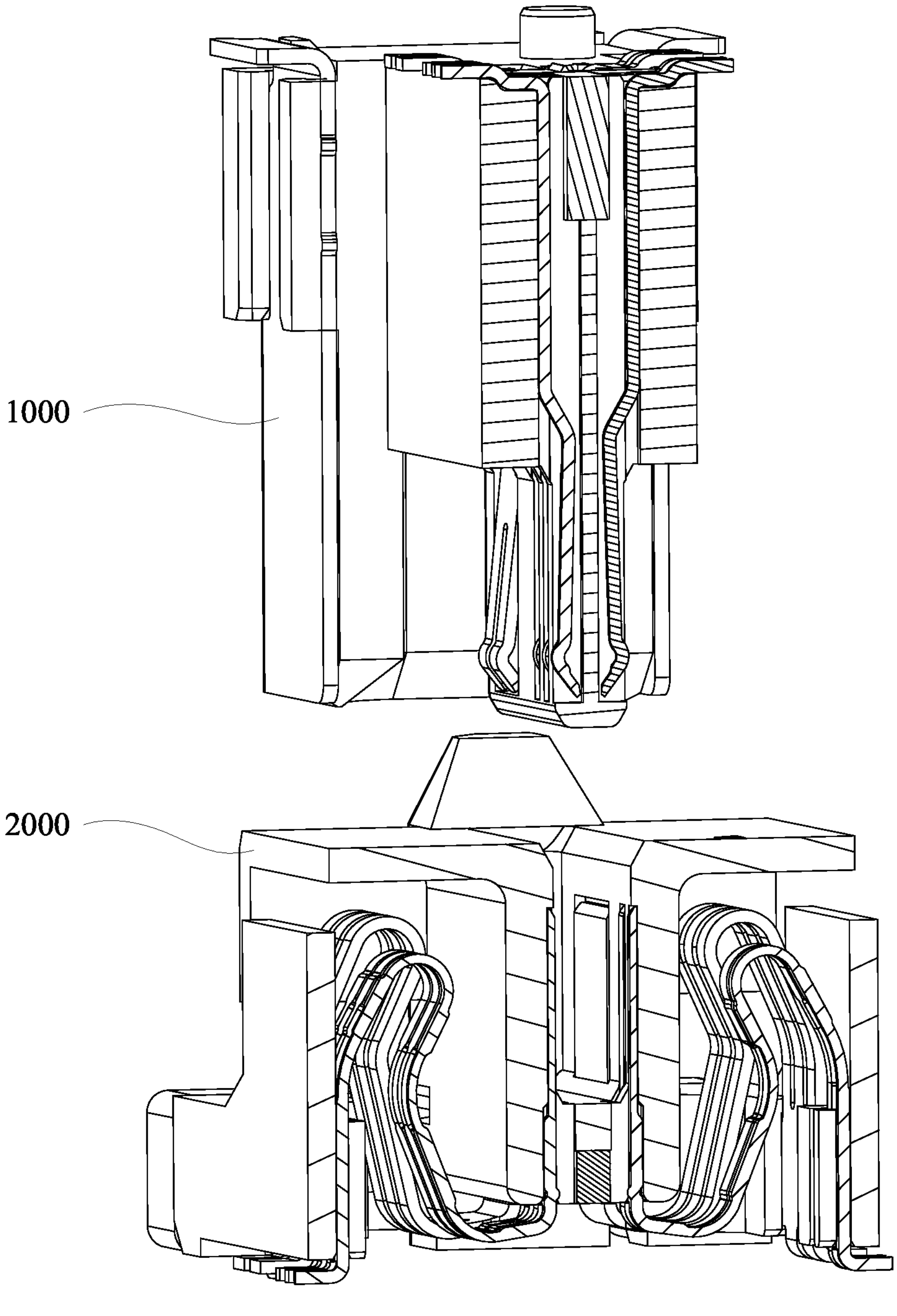
FIG. 1 is a schematic diagram of structures of components of an electrical connector according to an embodiment of the present application.

In order to make the above-mentioned objects, features and advantages of the present application more obvious and understandable, the specific embodiments of the present application will be described in detail below with reference to the accompanying drawings. Many specific details are set forth in the following description in order to facilitate a full understanding of the present application. However, the present application may be implemented in many other manners than those described herein, and similar improvements can be made by those skilled in the art without contradicting the content of the present application, therefore, the present application is not limited by the specific embodiments disclosed below.

It should be noted that when a component is referred to as “fixed to” or “set on” another component, it may be directly on another component or there may be an intermediate component. When a component is referred to as “connected” to another component, it may be directly connected to another component or there may be an intermediate component as well. In addition, the terms “first” and “second” are used for descriptive purposes only and are not to be construed as indicating or implying relative importance or implicitly specifying the number of technical features indicated. Thus, features qualified with “first” and “second” may explicitly or implicitly include at least one such feature. In the description of the present application, “plurality” means at least two, such as two, three, etc., unless otherwise expressly and specifically limited.

In the present application, unless otherwise expressly specified and limited, the first feature is “above” or “below” the second feature may indicate that the first feature is directly in contact with the second feature, or the first feature is indirectly in contact with the second feature through an intermediate medium. Moreover, the first feature is “above”, “over” or “on top of” the second feature may indicate that the first feature is directly above or diagonally above the second feature, or only indicates that the first feature is horizontally higher than the second feature. The first feature is “under”, “below”, or “beneath” the second feature may indicate that the first feature is directly below or diagonally below the second feature, or only indicates that the first feature is horizontally lower than the second feature. Unless otherwise defined, all technical and scientific terms used in the specification of the present application have the same meaning as commonly understood by those skilled in the art to which the present application belongs. The terms used in the specification of the present application are for the purpose of describing specific embodiments only, and are not intended to limit the present application. The term "and/or" used in the specification of the present application includes any and all combinations of one or more of the relevant listed items.

A kind of board-to-board connector known by the applicant does not have the stable electrical connection ability when the center of the plug interface of the plug connector and that of the socket connector are deviated more than +0.2 mm. Therefore, if the traditional board-to-board connector is employed to work in a high vibration environment, or a low temperature environment where the temperature of the corresponding contact area is below −20° C., or a high temperature environment where the temperature of the corresponding contact area is above 85° C., it will cause a data transmission failure and even damage to the connector, etc. In application scenarios such as a vehicle traveling at a high speed on a bumpy road, a rapid CT scanning, or an ultrasonic probe interconnection between multi-layer boards, etc., it is very easy for the electrical connection in the contact area to be disconnected instantaneously, thus posing a safety risk and it is easy to cause accidents.

Therefore, it is necessary to improve the floating plate-to-plate connection technology.

In an embodiment of the present application, an electrical connector includes a plug connector and a socket connector which are connected in a floating and detachable manner. The socket connector includes an upper socket housing, a lower socket housing, a socket grounding conductor, two sets of socket signal conductors and two sets of socket power conductors. The two sets of the socket signal conductors are arranged in a misaligned manner. Each set of the socket signal conductor includes a plurality of socket signal conductor structures. Each socket signal conductor structure includes at least one socket signal mounting interference portion. Each socket power conductor includes at least one socket power mounting interference portion. The lower socket housing is snap-mounted onto the socket signal mounting interference portions and the socket power mounting interference portions. The socket grounding conductor is fixed onto the lower socket housing and connected to part of the socket signal conductor structures in each set of the socket signal conductor. The upper socket housing is mounted onto the lower socket housing through an insertion connection (e.g., a snap connection). The two sets of the plug signal conductors of the plug connector are also arranged in a misaligned manner, and the plug signal conductor structures of the two sets of the plug signal conductors and the socket signal conductor structures of the two sets of the socket signal conductors are in one-to-one correspondence to achieve an electrical contact when the plug connector is connected to the socket connector. For the above electrical connector, on the one hand, the lower socket housing is snap-mounted through the mounting interference portions, and a floating connection between the plug connector and the socket connector is also realized, allowing a greater tolerance for mounting errors and is suitable for high vibration environments. On the other hand, the socket signal conductors and the plug signal conductors are all arranged in the misaligned manner, reducing a crosstalk between shoulder-to-shoulder and face-to-face differential pairs in the electrical connector, reducing an interference, ensuring that the electrical performance of the electrical connector is in a controllable state in a large mounting tolerance state, which is beneficial to ensure a high-speed transmission of a large amount of data, especially for high vibration environments.

In one of the embodiments, an electrical connector includes some structures or all structures of the following embodiments, i.e., the electrical connector includes part of the following technical features, or all the following technical features. In one of the embodiments, an electrical connector includes a plug connector and a socket connector which are connected in a floating and detachable manner. The socket connector includes an upper socket housing, a lower socket housing, a socket grounding conductor, two sets of socket signal conductors and two sets of socket power conductors. The socket signal conductors of the socket connector abut against the plug signal conductors of the plug connector. The socket power conductors of the socket connector abut against the plug power conductors of the plug connector. The plug connector and the socket connector are movable relative to each other, and the plug connector and the socket connector are not fixed, i.e., the plug connector and the socket connector are connected in a floating and detachable manner.

In order to avoid interferences between differential pairs, in one of the embodiments, the socket grounding conductor is fixed onto the lower socket housing and connected to part of the socket signal conductor structures in each set of the socket signal conductor. The two sets of the socket signal conductors are arranged in a misaligned manner, and the two sets of the plug signal conductors of the plug connector are also arranged in a misaligned manner. The plug signal conductor structures of the two sets of the plug signal conductors and the socket signal conductor structures of the two sets of the socket signal conductors are in one-to-one correspondence to achieve an electrical contact when the plug connector is connected to the socket connector. In one of the embodiments, in the two sets of the socket signal conductors arranged in the misaligned manner, along an extension direction of the socket grounding conductor, a misalignment distance L1 between the first socket signal conductor structure of one set of the socket signal conductor and the first socket signal conductor structure of the other set of the socket signal conductor is greater than or equal to a spacing L2 or a center-to-center spacing L3 between adjacent socket signal conductor structures in a same set. For example, the misalignment distance L1 between the first socket signal conductor structure of one set of the socket signal conductor and the first socket signal conductor structure of the other set of the socket signal conductor is equal to the center-to-center spacing L3 of the socket signal conductor structures in a same set, i.e., the first socket signal conductor structure of one set of the socket signal conductor faces the second socket signal conductor structure of the other set of the socket signal conductor. For example, the misalignment distance L/between the first socket signal conductor structure of one set of the socket signal conductor and the first socket signal conductor structure of the other set of the socket signal conductor is greater than or equal to the center-to-center spacing L3 between adjacent socket signal conductor structures in a same set, i.e., in the misalignment arrangement, the misalignment has at least one PIN distance. The misalignment arrangements in remaining embodiments are similar and will not be repeated. By such a design, the socket signal conductors and the plug signal conductors are all arranged in the misaligned manner, and the additional socket grounding conductor is utilized to interconnect all conductors for shielding and grounding in the two rows of conductors (i.e., the two sets of the socket signal conductors and the two sets of the socket power conductors), which is beneficial to reduce the crosstalk between the shoulder-to-shoulder differential pairs in the electrical connector, and reduce the crosstalk between the face-to-face differential pairs in the electrical connector, ensuring that the electrical performance of the electrical connector is in a controllable state in a large mounting tolerance state, and ensuring a high-speed transmission of a large amount of data.

In order to avoid the interferences between the differential pairs, in addition to the misalignment design, the socket connector in the embodiments of the present application is also skillfully designed with a socket grounding conductor. In order to further interconnect all shielding and grounding conductors including the socket signal conductors and the socket power conductors, in one of the embodiments, for the socket signal conductor structures in each set of the socket signal conductor, every third socket signal conductor structure is connected to the socket grounding conductor. Such a design is beneficial to ensure the rate and the accuracy of data transmission in the high-speed transmission of a large amount of data even if a center position of the board-to-board connection is deviated within a preset range, especially for the high vibration environments, ensuring a fault tolerance of a grounding signal, and avoiding the interference between the differential pairs.

In order to realize a stable connection between the lower socket housing and the upper socket housing of the socket connector, in one of the embodiments, each set of the socket signal conductor includes a plurality of socket signal conductor structures. Each socket signal conductor structure includes at least one socket signal mounting interference portion, and each socket power conductor includes at least one socket power mounting interference portion. The lower socket housing is mounted onto the socket signal mounting interference portions and the socket power mounting interference portions through an insertion connection (e.g., a snap connection). The upper socket housing is mounted onto the lower socket housing through an insertion connection (e.g., a snap connection). Furthermore, in one of the embodiments, the mounting interference portions, including the socket signal mounting interference portions and the socket power mounting interference portions, are each provided with a threaded or stepped structure to improve the mounting stability. By such a design, the lower socket housing can be firmly mounted onto the mounting interference portions of the socket signal conductors and the socket power conductors without screws or adhesive. On the one hand, it is convenient for assembly. On the other hand, the interference on the high-speed transmission of a large amount of signal data caused by screws can be avoided. In addition, the upper socket housing can also be firmly mounted onto the lower socket housing without screws or adhesive, thus forming an electrical connector that is easy to assembly as a whole and light in weight, and is especially suitable for vehicle application environments that requires light weight and small size.

In order to facilitate the assembly of the plug connector, in one of the embodiments, the plug connector also includes a plug housing, a plug grounding conductor, and two sets of plug power conductors. Each plug signal conductor structure includes at least one plug signal conductor interference portion, and each plug power conductor includes at least one plug power conductor interference portion. The plug housing is mounted onto the plug signal conductor interference portions and the plug power conductor interference portions through an insertion connection (e.g., a snap connection). The plug grounding conductor is fixed onto the plug housing and connected to part of the plug signal conductor structures in each set of the plug signal conductor. Similarly, in one of the embodiments, the interference portions, including the plug signal conductor interference portions and the plug power conductor interference portions, are each provided with a threaded or stepped structure to improve the mounting stability. Besides the conductors of the plug and the conductors of the socket, there can be no other metal components affecting the signal transmission in the entire electrical connector, and the stability of the connection can be ensured completely without screws for screwing, thus meeting the requirements of fast, reliable, and large amount of data for signal transmission in the vehicle application environments.

In order to facilitate an effective and reliable electrical contact, in one of the embodiments, each plug signal conductor structure includes a signal conductor welding leg portion, an elastic deformation portion, and a signal conductor positioning protrusion located between the signal conductor welding leg portion and the elastic deformation portion. The elastic deformation portion is configured to elastically abut against the corresponding socket signal conductor structure to achieve an electrical contact when the plug connector is connected to the socket connector. The signal conductor positioning protrusion is configured to abut against a plug grounding end of the plug grounding conductor or the plug housing. By such a design, the effective connection and conductivity of the conductor structures and the plug conductors can still be guaranteed even if the center position of the board-to-board connection is deviated within a preset range, and due to the simple structure, the electrical connector is suitable for working in certain low temperature environments and high temperature environments.

In the embodiments, since the plug connector and the socket connector are movable related to each other, in order to enhance the mounting stability of the socket connector, in one of the embodiments, the socket connector further includes two socket welding reinforcement legs. The two socket welding reinforcement legs are provided at two ends of the lower socket housing respectively, and the socket welding reinforcement legs fixedly snap to the upper socket housing. Furthermore, in one of the embodiments, the socket welding reinforcement legs, the socket signal conductors, and the socket power conductors are fixed onto a first circuit board (such as a socket mounting circuit board), respectively. The fixing methods include plugging, snaping, and welding, etc. In one of the embodiments, the plug connector also includes plug welding reinforcement legs, and the plug welding reinforcement legs are detachably arranged on the plug housing of the plug connector. Furthermore, in one of the embodiments, the plug welding reinforcement legs, the plug signal conductors, and the plug power conductors of the plug connector are fixed onto a second circuit board (such as a plug mounting circuit board), respectively. The fixing methods include plugging, snaping, and welding, etc. In one of the embodiments, the socket connector includes two socket welding reinforcement legs, the two socket welding reinforcement legs are arranged on two ends of the lower socket housing respectively, and the socket welding reinforcement legs fix the upper socket housing by a snap connection. In addition, the plug connector also includes plug welding reinforcement legs, and the plug welding reinforcement legs are detachably arranged on the plug housing of the plug connector. Similarly, the fixing methods include plugging, snaping, and welding, etc. The arrangement of the welding reinforcement legs in remaining embodiments is similar, and will not be repeated. Such a design is beneficial to mount and fix the plug connector and the socket connector respectively, on the one hand, enhancing the mounting stability of the lower socket housing and the upper socket housing of the socket connector, on another hand, enhancing the mounting stability of the lower socket housing, and on another hand, facilitating the mounting stability of the plug housing. In this case, the first circuit board and the second circuit board are independent relative to each other, and the first circuit board and the second circuit board are coupled only through the socket signal conductors and the socket power conductors, thus achieving the floating board-to-board electrical connection.

In one of the embodiments, each plug signal conductor structure includes at least one width or thickness adjusting portion at a position adjacent to or away from the plug signal conductor interference portion. In one of the embodiments, each socket signal conductor structure is also provided with at least one width or thickness adjusting portion adjacent to or away from the socket signal mounting interference portion. In one of the embodiments, each plug signal conductor structure includes at least one width or thickness adjusting portion adjacent to or away from the plug signal conductor interference position, in addition, the socket signal conductor structure is also provided with at least one width or thickness adjusting portion adjacent to or away from the socket signal mounting interference portion. The arrangement of the adjusting portion in remaining embodiments is similar, and will not be repeated.

In one of the embodiments, each socket signal conductor structure includes a middle bending portion, and the middle bending portion is bent in a direction towards the plug signal conductor structure. In one of the embodiments, an electrical connector includes a plug connector and a socket connector engaged vertically. In a specific application embodiment, an electronic connector includes a plug connector and a socket connector plugged vertically. The plug connector includes conductors, which may also be referred to as plug conductors, regularly arranged at certain intervals, and the plug conductors include plug signal conductors and plug power conductors. For each plug conductor, one end of the plug conductor is connected to a circuit board (i.e., a plug mounting circuit board) by welding, and the other end of the plug conductor includes an elastic deformation portion contacted with the socket connector. The plug conductors are arranged side-by-side in two rows. There exists a misalignment in a Z-direction as described below between the two rows of the plug conductors, and the misalignment has at least one PIN distance. The plug conductors in each row are arranged in a signal arrangement mode of Ground-Signal-Signal-Ground, and then all the grounded plug signal conductors and all the grounded plug power conductors of the plug connector are conducted at least one time by a plug grounding conductor. Two ends of the plug housing are each mounted with a reinforcement welding leg, i.e., the plug welding reinforcement leg, for enhancing the welding strength on the circuit board of the electrical connector. In each row of the plug signal conductors of the plug conductors, a spacing between adjacent plug signal conductor structures is a fixed value, which is referred to as one PIN. However, the spacing between the plug power conductors and the plug signal conductors or the spacing of the plug power conductors are adjusted accordingly according to a current carrying capability of the connector and requirements for the voltage of the plug, and the spacings are set the same as or different from the spacing of the plug signal conductors.

The socket connector includes socket conductors that are stamped in an R shape. The socket conductors include the socket signal conductors and the socket power conductors. Alternatively, the socket signal conductors and the socket power conductors that are welded onto a circuit board (e.g., a socket mounting circuit board) are referred to as the socket conductors. Each socket conductor includes a welding leg portion for welding to the circuit board, a middle bending portion with an R shape, and a sliding insertion portion for conducting with the conductors of the plug connector. The socket conductors are arranged in rows at certain intervals in two columns, or referred to as two rows. When arranged, the R-shaped middle bending portions of the two rows of the socket conductors are bent toward the center of the electrical connector. When arranged, the R-shaped middle bending portions of the two rows of the socket conductors are bent to approach a plane where an X-axis of the socket connector is located. The socket conductor welding leg portions are welded and fixed onto the circuit board. Since the socket conductors are assembled onto the lower socket housing and are fixed adjacent to the welding leg portions of the socket conductors, the lower socket housing is fixed onto the circuit board together with the welding leg portions of the socket conductors. Meanwhile, the sliding insertion portions of the socket conductors are assembled with the upper socket housing, and the upper socket housing is connected to the welding leg portions of the socket conductors through the R-shaped bending portions. Since the material of the conductors itself has a deformation capability, when the plug connector is inserted into the socket connector, even if the center positions of the two connectors are deviated within a limited value, the plug housing will forcibly guide the centerline of the upper socket housing to substantially coincide with the centerline of the plug housing under the mutual guiding actions between a guide slot of the plug housing and a guidepost of the upper socket housing. In this case, the R-shaped bending portions are deformed, and a reliable electrical connection between the two connectors can be realized within a certain range of circumference with the centerline of the upper socket housing as the origin. In addition, the linear deformation of the R-shaped bending portions can reduce the stresses caused by the mounting deviation to the floating plug conductors, the portions where the welding legs of the plug are welded with the circuit board, and the portions where the welding legs of the socket are welded with the circuit board. There also exists a misalignment in the Z-direction as described below between the two rows of the socket conductors, and the misalignment has at least one PIN distance. It can be understood that in order to achieve the electrical connection, there is a one-to-one correspondence between the plug signal conductor structures of the plug signal conductors and the socket signal conductor structures of the socket signal conductors. The socket conductors in each row are arranged in a signal arrangement mode of Ground-Signal-Signal-Ground-Signal-Signal-Ground near a straight section where the socket conductor sliding insertion portion extends down to a first bend, and then all the grounded conductors of the socket connectors are interconnected by a socket grounding conductor. When the socket conductors are arranged, the R-shaped middle bending portions of the two rows of socket conductors are bent toward the center portion of the electrical connector. When arranged, the R-shaped middle bending portions of the two rows of socket conductors are bent to approach the plane where the X-axis of the socket connector is located. At both ends of the plug housing, each end is equipped with a welding reinforcement leg, i.e., the socket welding reinforcement leg, for enhancing the welding strength of the electrical connector on the circuit board.

In the portion of each socket conductor from the welding leg portion welded with the circuit board to the elastic deformation portion in contact with the socket connector, there exists at least one clamping point, i.e., a mounting interference portion, assembled with the lower socket housing, the at least one clamping point includes a socket signal mounting interference portion and a socket power mounting interference portion. There exists at least one width or thickness adjustment, i.e., a variation adjusting portion, of the socket conductor in the non-clamping point portion assembled inside the insulating socket housing. The socket connector includes socket conductors stamped in an R shape, and further includes a lower socket housing, an upper socket housing, and a welding reinforcement legs at each of the two ends in the length direction. Each socket conductor includes a wending leg portion welded with the circuit board, an R-shaped middle bending portion, and a sliding insertion portion for conducting with the plug conductor of the plug connector. The welding leg portion of the socket conductor for welding with the circuit board is completely fixed onto the circuit board by welding. The socket conductor extends vertically upward along the right side of the welding leg portion to form a straight section with at least one clamping point. In the straight section, there exists at least one variation in the width or thickness direction. The straight section is configured to assemble with the lower socket housing, so that the lower socket housing is fixed adjacent to an upper portion of the socket welding leg. The socket conductor continues to extend upward at the straight section, and is bent obliquely toward the plane where the X-axis of the socket connector is located when the socket conductor extends beyond a dedicated portion where the lower socket housing interferes with the clamping point of the socket conductor, and a bending angle is an obtuse angle. The socket conductor continues to extend to form the R-shaped bending portion. Specifically, firstly, the socket conductor is stamped and bent to form a back-bending structure, and a centerline of the back-bending portion is inclined toward the plane where the X-axis of the socket connector as described below is located. Then, the back-bending structure, after extending for a certain length, is bent again to approach the plane where the X-axis of the socket connector is located. The socket conductor continues to extend, at the bending portion, to a position below and adjacent to the upper socket housing, and is bent again to approach the plane where the X-axis of the socket connector is located to extend close to the upper socket housing, until extending directly below the conductor mounting hole of the upper socket housing, the socket conductor is then bent vertically upward, thus forming a bending structure as a whole relative to the back-bending structure. The socket conductor bent vertically upward continues to extend upwardly, and at least one clamping point for assembly interference with the upper socket housing is provided in the extended portion. When continuing to extend upwardly beyond the interference area of the clamping point of the upper socket housing, the socket conductor extends to form a sliding insertion area for docking with the plug conductor. In one of the embodiments, in the whole area of the socket conductor from the welding leg portion welded with the circuit board to the sliding insertion portion engaged with the plug conductor, there exists at least one width and thickness variation area.

In one of the embodiments, the socket conductors are arranged in two rows at certain intervals. When arranged, the R-shaped middle bending portions of the two rows of socket conductors are bent toward the center portion of the electrical connector. When arranged, the R-shaped middle bending portions of the two rows of socket conductors are bent to approach the plane where the X-axis of the socket connector is located. There exists a misalignment in the Z-direction as described below between the two rows of the socket conductors, and the misalignment has at least one PIN distance. The socket conductors in each row are arranged in a signal arrangement mode of Ground-Signal-Signal-Ground. Under the upper socket housing, the socket grounding conductor is utilized to interconnect all grounding conductors of the socket signal conductors and all grounding conductors of the socket power conductors in the socket connector at least one time. The welding leg portion of each socket conductor is welded and fixed to the circuit board. Since each socket conductor is assembled on the lower socket housing and is fixed adjacent to the welding leg portion of the socket conductor, the lower socket housing is fixed on the board together with the welding leg portion of each socket conductor. Meanwhile, the sliding insertion portion of each socket conductor is assembled with the upper socket housing, and the upper socket housing is connected to the welding leg portion of each socket conductor through the R-shaped bending portion. In this case, each R-shaped bending portion (i.e., the middle bending portion) is floated in an internal space formed by the upper socket housing and the lower socket housing. Since the material (e.g., copper) of the conductors itself has a deformation capability, when the plug connector is inserted into the socket connector, even if the center positions of the plug connector and the socket connector are deviated within a limited value, the plug housing will forcibly guide the centerline of the upper socket housing to substantially coincide with the centerline of the plug housing under the mutual guiding actions between a guide slot of the plug housing and a guidepost of the upper socket housing. In this case, the R-shaped bending portion (i.e., the middle bending portion) is deformed, and a reliable electrical connection between the plug connector and the socket connector can be realized accordingly within a certain range of circumference with the centerline of the upper socket housing as the origin. The linear deformation of the R-shaped bending portion can reduce the stresses caused by the mounting deviation to the floating plug conductor, the area where the welding leg of the plug is welded with the circuit board, and the area where the welding leg of the socket is welded with the circuit board, thereby achieving an effective and reliable electrical connection. In addition, in each embodiment, there exists a structure limit between the upper socket housing and the lower socket housing for preventing a range of the connection deviation between the socket connector and the plug connector from exceeding a set value. Through a gap between the upper socket housing and the lower socket housing, when the upper socket housing moves with the guidance of the plug housing, the upper socket housing may be in contact with the lower socket housing when moving to a certain extent, and may be blocked by the lower socket housing, thereby preventing an irreversible deformation caused by exceeding a yield strength of the material of the socket conductor, or a damage to the connector.

Furthermore, each socket signal conductor structure includes a socket signal welding leg portion, a middle bending portion, and a signal conductor sliding insertion portion connected in sequence. The socket signal welding leg portion is configured to be welded with the circuit board. The back-bending structure and the bending structure are formed on the middle bending portion. The middle bending portion includes a first interference region adjacent to the socket signal welding leg portion. The first interference region is configured to be in close contact with the lower socket housing to fix the lower socket housing. The signal conductor sliding insertion portion is conducted with the plug signal conductor structure of the plug connector. The signal conductor sliding insertion portion includes a second interference region adjacent to the middle bending portion. The second interference region is in close contact with the upper socket housing to fix the upper socket housing. When the first interference region is in close contact with the lower socket housing and the second interference region is in close contact with the upper socket housing, the back-bending structure and the bending structure are floatingly exposed between the lower socket housing and the upper socket housing, so that, in a high vibration environment, the back-bending structure and/or the bending structure are separated from the lower socket housing, i.e., the back-bending structure and the bending structure are indirectly connected between the lower socket housing and the upper socket housing through the first interference region and the second interference region respectively. Three relatively independent vibration regions are formed accordingly in the high vibration environment. The three vibration regions are the lower socket housing, the back-bending structure, and the bending structure, respectively. By such a design, when the socket signal conductor structure is applied to the board-to-board connection, the socket signal welding leg portion is welded and fixed, the signal conductor sliding insertion portion is detachably fixed relative to the plug connector by plugging in the plug connector, and the upper socket housing and the lower socket housing are fixed to the socket signal conductor structure through the two interference regions. On the one hand, the double vibration damping of the back-bending structure and the bending structure is skillfully designed, which is suitable for the high vibration environment. On the other hand, since the material of the conductor itself has the deformation capability, the effective connection and conduction of the socket signal conductor structures and the plug signal conductor structures still can be effectively ensured even if the center positions are deviated within a preset range during the board-to-board connection. On the other hand, due to the above-mentioned simple structure, the electrical connector is suitable for working in a certain low temperature environment and high temperature environment. Furthermore, in one of the embodiments, the middle bending portions are at least partially vacant. By such a design, since the middle bending portions is partially vacant, a floated state is formed, i.e., the middle bending portion is not in hard contact with other portions, which is conducive to realize the cushioning and shock absorption in the high vibration environment, and avoiding a hard transmission of the vibration. Furthermore, since the middle bending portion is also a part of the socket signal conductor structure, it is beneficial to adapt to a high vibration state in the certain low temperature environment and high temperature environment, thereby ensuring the accuracy of signal transmission, and avoiding the problem of packet loss in the transmission of a large amount of data, which is especially suitable for a high-speed signal transmission. In the embodiments, a vibration frequency of the high vibration environment is not higher than 2000 Hz, and an acceleration is not higher than 150 $m/s^2$. The temperature of the above-mentioned low temperature environment is not lower than-55° C. The temperature of the above-mentioned high temperature environment is not higher than +125° C. In other words, the above-mentioned high and low temperature environments can be application environments with a temperature of −55° C. to +125° C.

In order to facilitate mounting of the upper socket housing and the lower socket housing, in one of the embodiments, the first interference region is in close contact with the lower socket housing, and the second interference region is in close contact with the upper socket housing to fix the socket housing. In one of the embodiments, the middle bending portion has an R shape. One of the bending portions of the R shape acts as the back-bending structure, and the other one of the bending portions of the R-shape acts as the bending structure. The back-bending structure and the bending structure are exposed outside the lower socket housing when the first interference region is in close contact with the lower socket housing and the second interference region is in close contact with the upper socket housing. By such a design, when the lower socket housing is fixed on the socket signal conductor structure, the back-bending structure and the bending structure form two floating states. The vibration from a position where the socket signal conductor structure is mounted is first transmitted to the back-bending structure, then to the bending structure, and then to the plug connector. Vice versa, the vibration from the plug connector is first transmitted to the bending structure, then to the back-bending structure, and then to the position where the socket signal conductor structure is mounted, that is, the vibration has passed through two floating state of shock absorption. So that it is beneficial to adapt to the high vibration state in a certain low temperature environment and high temperature environment. Since the material of the conductor itself has the deformation capability, even if the center positions are deviated within a preset range during the board-to-board connection, it can still effectively ensure the effective connection and conduction of the socket signal conductor structure and the plug signal conductor structure (e.g., the plug signal conductor). In each embodiment, the preset range is within a circular space with a radius of 0.5 mm to 0.8 mm.

In order to improve the floating damping effect, in one of the embodiments, the back-bending structure and the bending structure are located in different planes. In one of the embodiments, the middle bending portion is sequentially provided with a first straight segment, a second bending segment, a third straight segment, a fourth bending segment, a fifth straight segment, a sixth bending segment, a seventh straight segment, an eighth bending segment, and a ninth straight segment. The first straight segment is connected to the socket signal welding leg portion, and the first straight segment includes the first interference region. The second bending segment, the third straight segment, the fourth bending segment, the fifth straight segment, and the sixth bending segment jointly form the back-bending structure. The seventh straight segment, the eighth bending segment, and the ninth straight segment jointly form the bending structure. The ninth bending segment is connected to the signal conductor sliding insertion portion. In one of the embodiments, an extension direction of the first straight segment is parallel to an extension direction of the sliding insertion portion. Such a design, on the one hand, is innovative in space, and can perform floating vibration damping from multiple directions and angles to release the vibration energy. On the other hand, the back-bending structure and the bending structure facilitate forming the overall paralleled first straight segment and the sliding insertion portion to fit the upper socket housing and the lower socket housing, so that the upper socket housing and the lower socket housing are normatively fixed to the socket signal conductor structure.

In order to better improve the floating vibration damping effect, in one of the embodiments, a first angle α is formed between the extension direction of the first straight segment and the extension direction of the socket signal welding leg portion. A second angle β is formed between the extension direction of the ninth straight segment and the extension direction of the signal conductor sliding insertion portion. A third angle γ is formed between the extension direction of the first straight segment and the extension direction of the third straight segment at the second bending segment. A fourth angle δ is formed between the extension direction of the fifth straight segment and the extension direction of the seventh straight segment at the sixth bending segment. A fifth angle ε is formed between the extension direction of the seventh straight segment and the extension direction of the ninth straight segment at the eighth bending segment. The first angle α is greater than or equal to 90 degrees, the second angle β is greater than or equal to 90 degrees, the third angle γ is greater than 90 degrees, the fourth angle δ is greater than or equal to 90 degrees, and/or, the fifth angle ε is greater than or equal to 90 degrees. Furthermore, in one of the embodiments, the fourth bending segment is semicircular or semielliptical. By such a design, the shape of each bending shape in the middle bending portion is standardized. The first angle α to the fifth angle ε are designed as right angles or obtuse angles, which is beneficial to reduce the impact on the strength and stress of the material itself of the conductor while properly releasing the vibration energy, ensuring that the floating vibration damping state formed by the bending is adapted to a material yield strength of the socket signal conductor structure, thereby ensuring the normally designed life of the product, as well as ensuring the high-speed transmission of a large amount of data.

It can be understood that the connection between the plug connector and the socket connector involves a plurality or even a large amount of the socket signal conductor structures. Each of the socket signal conductor structures exists in a three-dimensional environment formed when the plug connector is connected to the socket connector. Therefore, in order to improve the floating damping effect in the three-dimensional environment, in one of the embodiments, a centerline of the back-bending structure is inclined towards the extension direction of the sliding insertion portion. In one of the embodiments, the back-bending structure is bent toward a direction close to the welding leg portion after extending a certain length relative to the welding leg portion. In one of the embodiments, the back-bending structure deviates from and/or is twisted relative to a plane formed by the first straight segment and the socket signal welding leg portion. In one of the embodiments, the fourth bending segment is deviated or twisted with respect to the plane formed by the first straight segment and the socket signal welding leg portion. By such a design, it is beneficial for each socket signal conductor structure to form multi-angle vibration damping directions in the three-dimensional space (e.g., with respect to a space rectangular coordinate system), and release vibration forces in different planes. Therefore, since the vibration is released in multiple positions of the socket signal conductor structure, the electrical contact is not easy to disengage, so that even if the center position is deviated within a preset range during the board-to-board connection, the effective connection and conduction of the socket signal conductor structure and the plug signal conductor structure still can be effectively ensured.

In order to facilitate the release of the vibration energy, in one of the embodiments, the first straight segment, the third straight segment, the fifth straight segment, the seventh straight segment, and/or the ninth straight segment are each provided with at least one width or thickness variation adjusting portion with respect to the second bending segment, the fourth bending segment, the sixth bending segment, and/or the eighth bending segment, and/or, the middle bending portion is provided with shape variation areas at positions where the straight segments are adjacent to the bending segments. Furthermore, in one of the embodiments, the variation adjusting area has a structure for widening, thickening, narrowing, or thinning. Furthermore, in one of the embodiments, each shape variation area is gradually changed in a stepped manner. Furthermore, in one of the embodiments, at least one straight segment or at least one bending segment is provided with a shape variation area at its own midsection. Furthermore, in one of the embodiments, at least one shape variation area differs from the remaining shape variation areas in a stepped direction. Such designs additionally block the transmission of vibration at each variation adjusting portion, and facilitate the release of the vibration energy.

In order to facilitate the manufacture of the socket signal conductor structure, in one of the embodiments, the socket signal welding leg portion, the middle bending portion and the signal conductor sliding insertion portion are integrally formed, and the middle bending portion has an R shape. In one of the embodiments, the centerline of the fourth bending segment intersects an XY plane formed by the first straight segment and the welding leg portion. In one of the embodiments, the fourth bending segment has a symmetrical structure and a centerline thereof intersects the plane formed by the first straight segment and the welding leg portion, and/or, the first straight segment, the second bending segment, the third straight segment, the fourth bending segment, the fifth straight segment, the sixth bending segment, the seventh straight segment, the eighth bending segment and the ninth straight segment are integrally formed. By such designs, it facilitates the manufacture and preparation of the socket signal conductor structure, and also facilitates the reduction of the production cost of the socket signal conductor structures, improving the production efficiency.

In one of the embodiments, the signal conductor sliding insertion portion includes a connection segment and an insertion segment connected to each other. The insertion segment is configured to be conducted with the plug signal conductor structure of the plug connector. The connection segment is connected to the middle bending portion and is adjacent to the bending structure, and the connection segment includes a second interference region. Furthermore, in one of the embodiments, the insertion section is configured to be conducted with the plug signal conductor structure of the plug connector in an insertion manner. In this embodiment, the extension direction of the socket signal welding leg portion is taken as an X direction (the plane where the socket signal welding leg portion is located can be referred to as the plane where the X-axis is located), the extension direction of the first straight segment of the middle bending portion is taken as a Y direction (the plane where the first straight segment is located can be referred to as the plane where the Y-axis is located), and the extension direction of the socket signal welding leg portion and the extension direction of the first straight segment can form an XY plane. The connection position of the socket signal welding leg portion and the middle bending portion form a right angle on the XY plane, alternatively, an acute or obtuse angle may be formed in other embodiments. The back-bending structure is bent in the X direction, and the back-bending structure is further deflected or twisted along the Z direction perpendicular to the XY plane. In other words, in this embodiment, the back-bending structure is deviated from the XY plane formed by the first straight segment and the socket signal welding leg portion, and is twisted with respect to the XY plane. It can be understood that when the connection position of the socket signal welding leg portion and the middle bending portion forms the right angle in the XY plane, the Y direction is perpendicular to the X direction, i.e., a plane rectangular coordinate system is formed. Furthermore, a first transition area provided at a position where the connection segment is adjacent to the insertion section acts as the shape variation area.

In the embodiments, the interference regions include first interference regions and second interference regions. Each interference region has at least two interference portions, and each interference portion is protruded from a middle bending portion or a signal conductor sliding insertion portion, i.e., the at least two interference portions of the first interference region are protruded from the middle bending portion, and the at least two interference portions of the second interference region are protruded from the signal conductor sliding insertion portion. By such a design, the upper socket housing and the lower socket housing are fixed to the socket signal conductor structures by multiple interference portions of the two interference regions, which facilitates connecting the lower socket housing to the plug connector only through a portion of the middle bending portion of each socket signal conductor structure, so that, through the double vibration damping effect of the back-bending structure and the bending structure, the vibration energy is better released, and the transmission of the vibration force between the socket connector and the plug connector is reduced.

Figure 2:
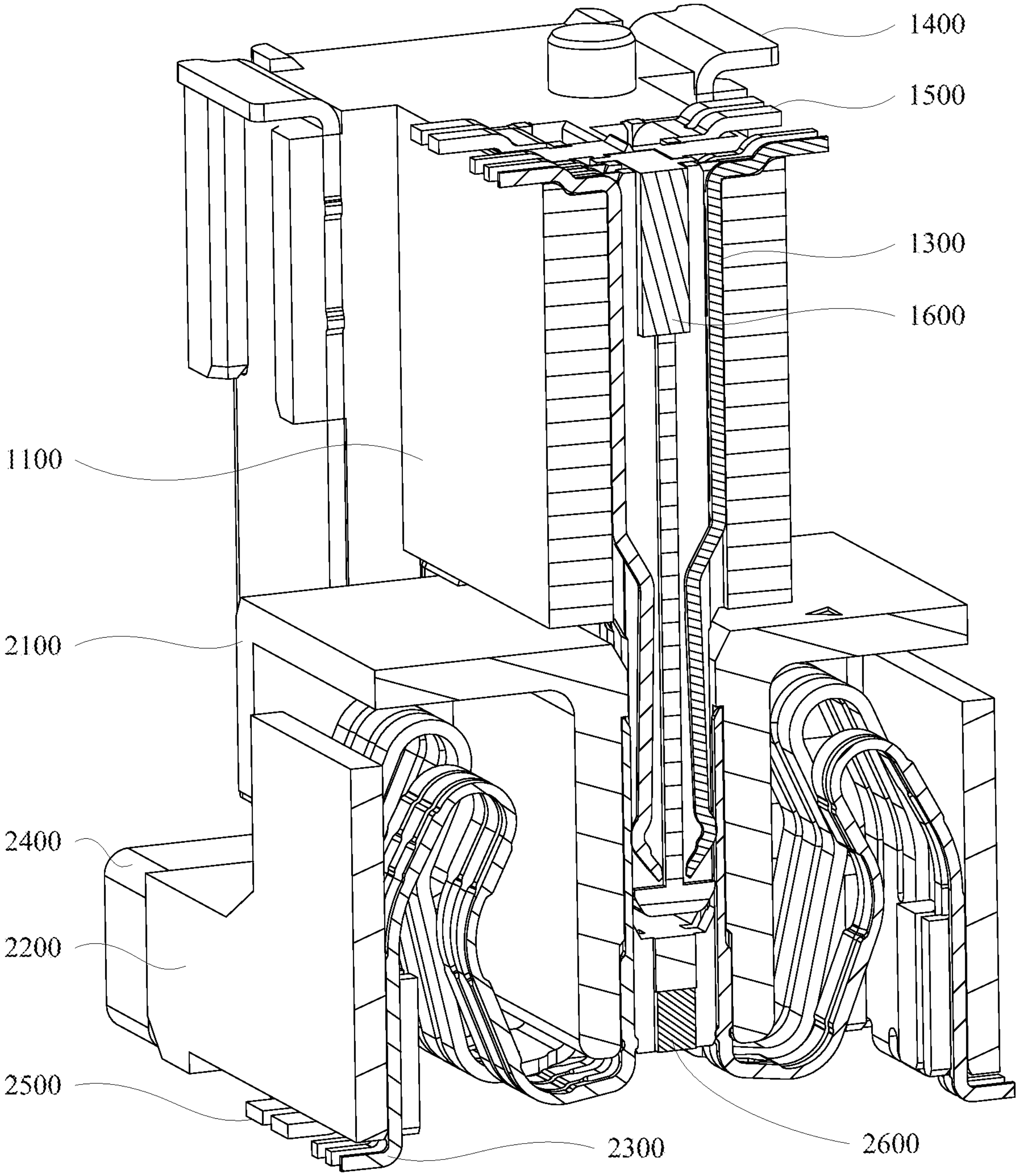
FIG. 2 is a schematic diagram of the components of the electrical connector shown in FIG. 1 in a connected state.

In one of the embodiments, as shown in FIG. 1, an electrical connector includes a plug connector 1000 and a socket connector 2000 which are detachably connected. A connection state of the plug connector 1000 and the socket connector 2000 is shown in FIG. 2. The socket connector 2000 includes an upper socket housing 2100, a lower socket housing 2200, socket welding reinforcement legs 2400, a socket grounding conductor 2600, two sets of socket signal conductors 2300 and two sets of socket power conductors 2500. The plug connector 1000 includes a plug housing 1100, a plug welding reinforcement leg 1400, a plug grounding conductor 1600, two sets of plug signal conductors 1300 and two sets of plug power conductors 1500.

Figure 3:
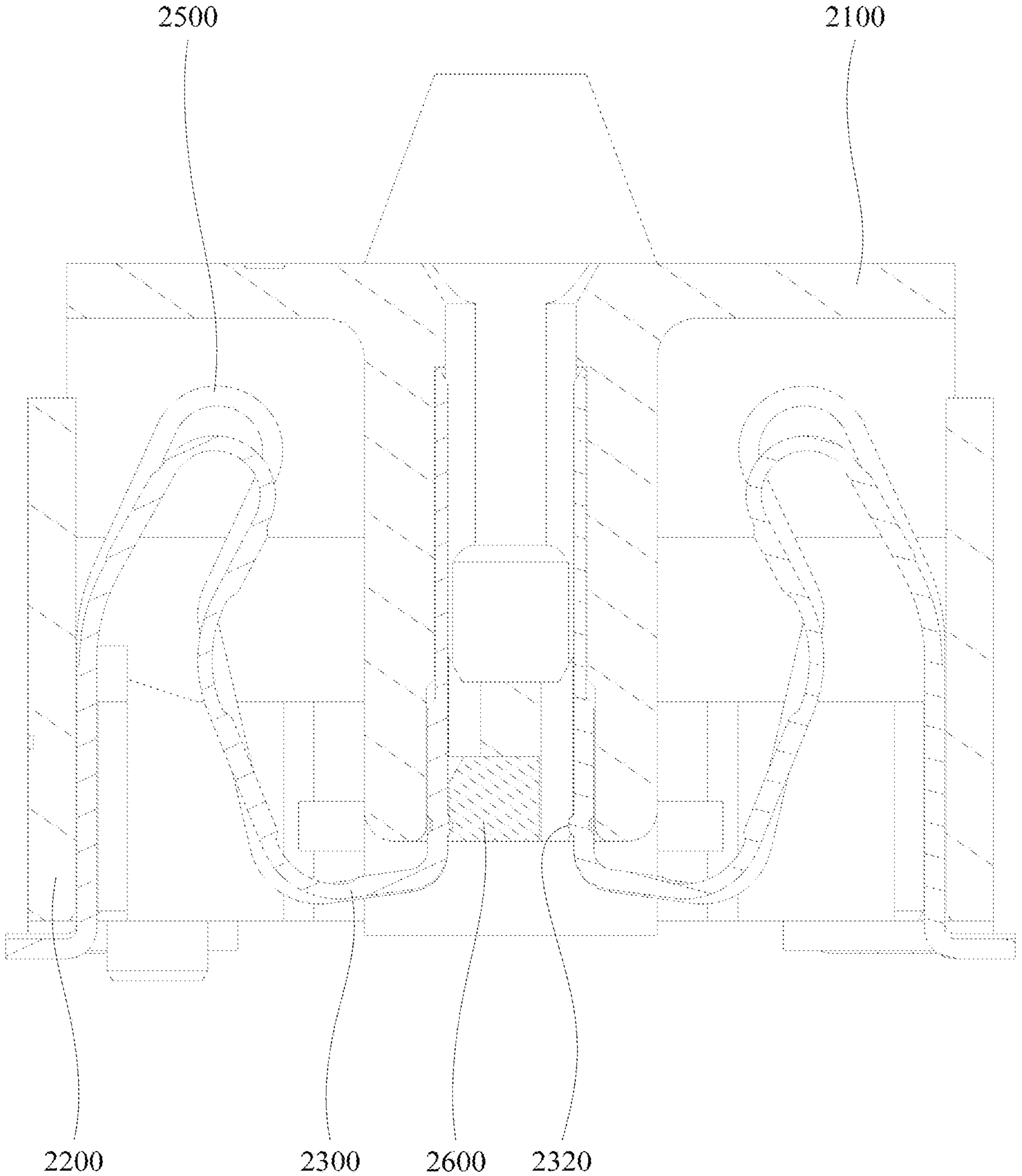
FIG. 3 is a schematic diagram of a structure of a socket connector of the electrical connector shown in FIG. 1.

Also referring to FIG. 3, the two sets of the socket signal conductors 2300 are arranged opposite each other. Each set of the socket power conductor 2500 and each set of the socket signal conductor 2300 include a middle bending portion. Part of socket signal positioning protrusions 2320 are vacant, and the other part of the socket signal positioning protrusions 2320 abut against the socket grounding conductor 2600 for grounding. The lower socket housing 2200 is connected to the upper socket housing 2100 only by the two sets of the socket signal conductors 2300 and the two sets of the socket power conductors 2500, and the connection therebetween is therefore called a floating connection.

Figure 4:
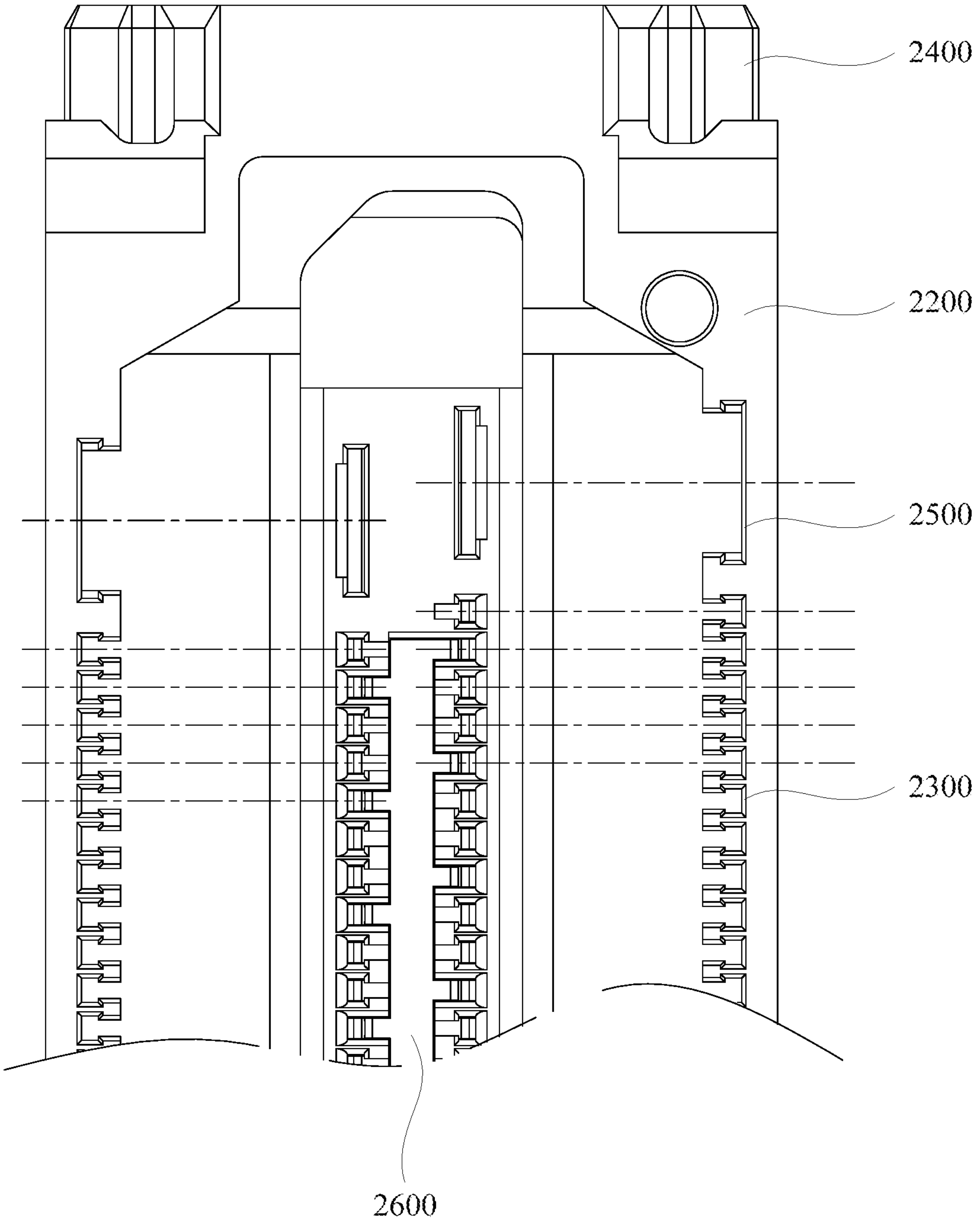
FIG. 4 is a schematic diagram of the structure of the socket connector shown in FIG. 3 in another direction.
Figure 5:
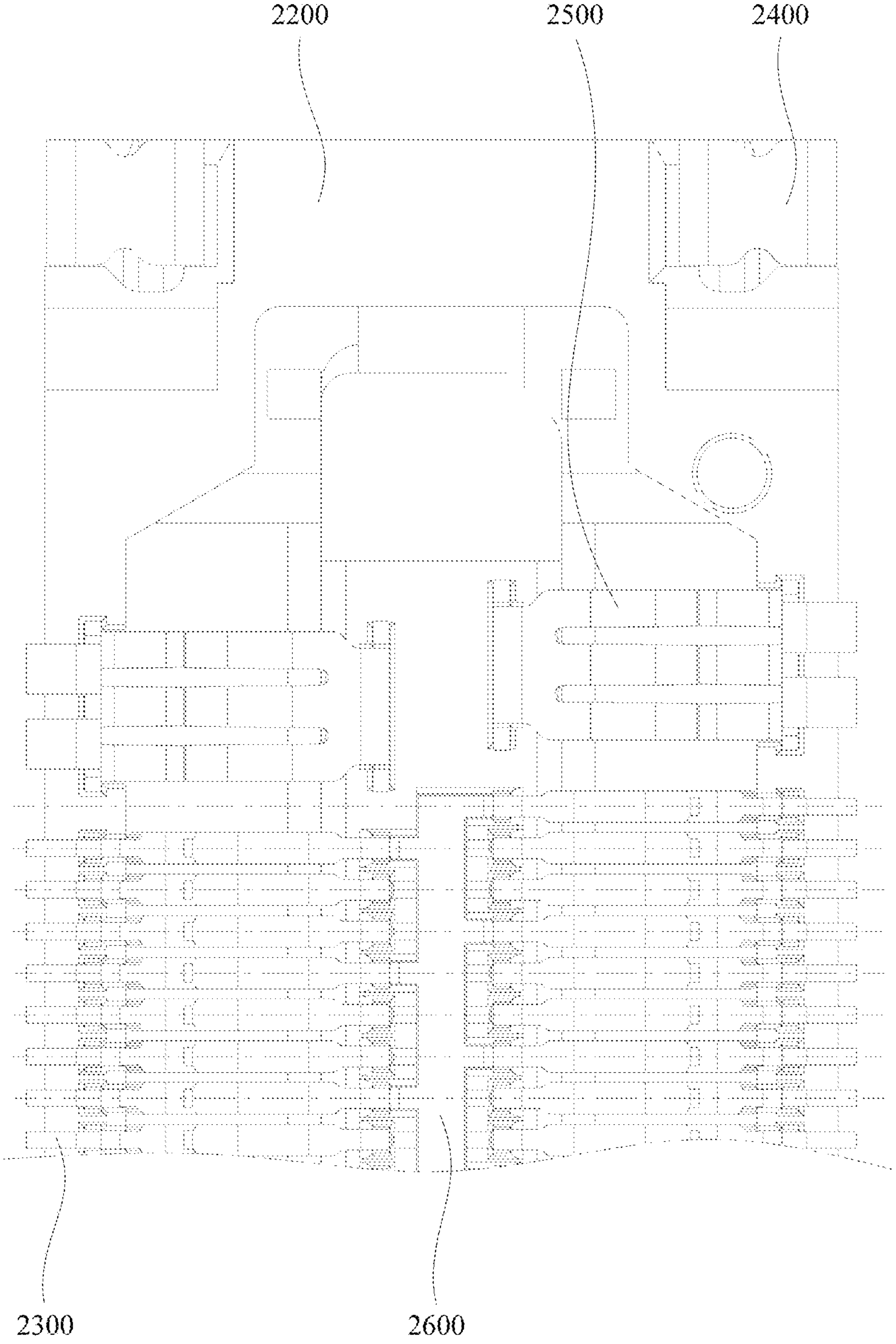
FIG. 5 is a schematic diagram of two sets of socket signal conductors arranged in a misaligned manner in another direction relative to FIG. 4.

Furthermore, the two sets of the socket power conductors 2500 are arranged in a misaligned manner. Furthermore, as shown in FIG. 4 and FIG. 5, the two sets of the socket signal conductors 2300 are arranged opposite each other and in a misaligned manner, and the two sets of the socket power conductors 2500 are also arranged opposite each other and in a misaligned manner. As shown in FIG. 4, the first socket signal conductor structure of one set of the socket signal conductor 2300 faces the second socket signal conductor structure of the other set of the socket signal conductor 2300. As shown in FIG. 5, every third socket signal conductor structure of the socket signal conductor 2300 is connected to the socket grounding conductor 2600.

Figure 6:
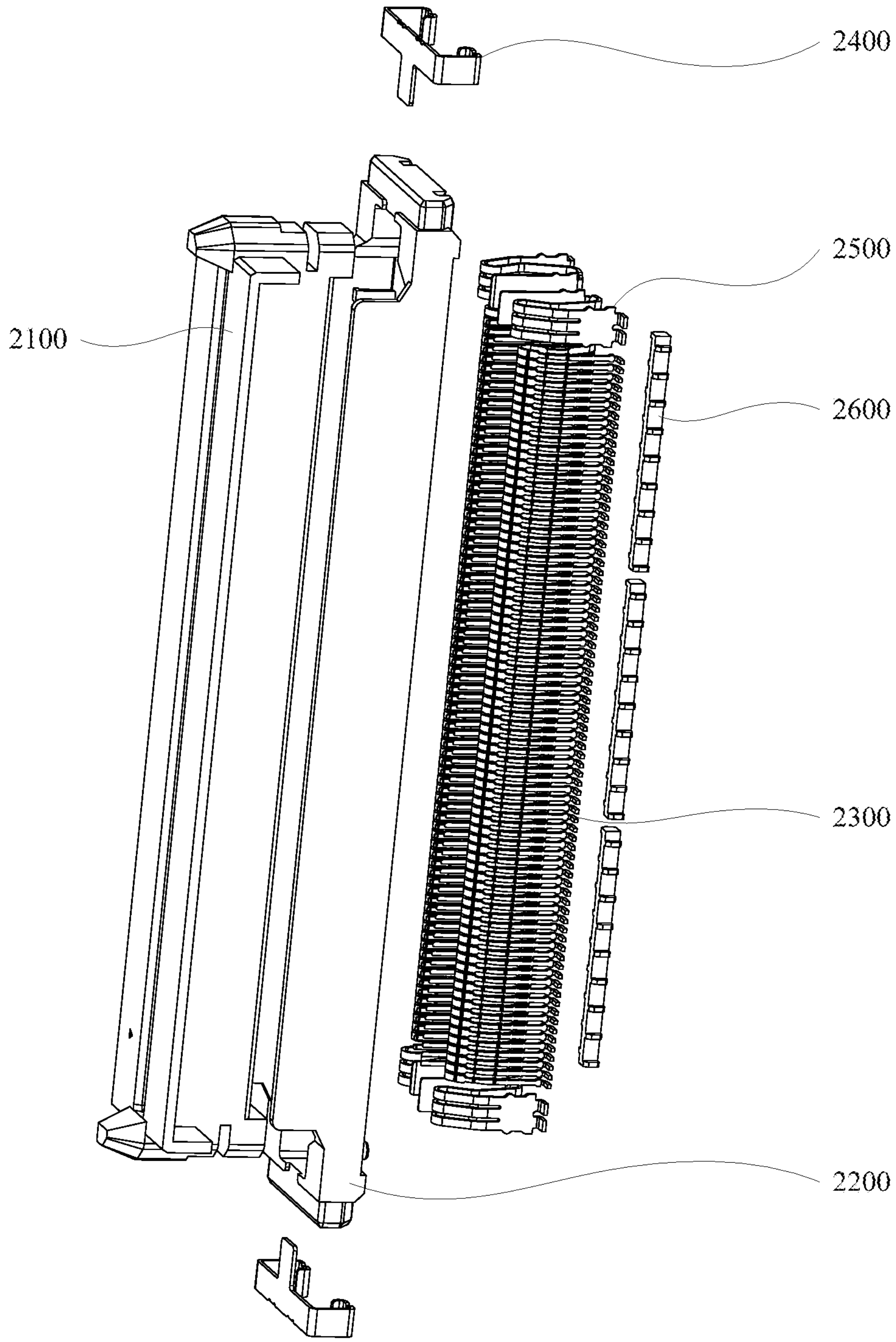
FIG. 6 is an exploded schematic diagram of a structure of a socket connector of the electrical connector shown in FIG. 1.

As shown in FIG. 6, the socket connector includes the upper socket housing 2100, the lower socket housing 2200, the socket grounding conductor 2600, two socket welding reinforcement legs 2400, the two sets of the socket signal conductors 2300, and two sets of the socket power conductors 2500. The socket welding reinforcement leg 2400 is arranged on each of the two ends of the lower socket housing 2200, and the socket welding reinforcement legs 2400 fixedly snap to the upper socket housing 2100. Also referring to FIG. 7, each set of the socket power conductor 2500 includes at least two socket power conductor structures 2501, and each socket power conductor structure 2501 includes at least one socket power mounting interference portion 2510. Each set of the socket signal conductor 2300 includes a plurality of socket signal conductor structures 2301 arranged side by side, and each socket signal conductor structure 2301 includes at least one socket signal mounting interference portion 2310. The lower socket housing 2200 is snap-mounted onto each socket signal mounting interference portion 2310 and each socket power mounting interference portion 2510. Furthermore, as shown in FIG. 7, adjacent socket power conductor structures 2501 are provided with an integrally formed mounting portion, and the socket power mounting interference portions 2510 are disposed at the mounting portion.

Both the lower socket housing 2200 and the upper socket housing 2100 are respectively provided with two rows of holes for mounting the socket conductors including the socket signal conductors 2300 and the socket power conductors 2500. The holes in one row of the lower socket housing and the holes in one row of the upper socket housing are in one-to-one correspondence, and the holes in the other row of the lower socket housing and the holes in the other row of the upper socket housing are in one-to-one correspondence. The socket power conductors 2500 are inserted into the lower socket housing 2200 and the upper socket housing 2100. The socket grounding conductor 2600 is mounted into a mounting slot of the upper socket housing 2100, and the upper socket housing 2100 is located inside the lower socket housing 2200. When the socket signal conductors 2300 are mounted to the lower socket housing 2200 and the upper socket housing 2100, protrusions (i.e., the positioning protrusions) disposed under the sliding insertion portions of the socket conductors and the plug grounding conductor 1600 of the plug connector 1000 are in contact by way of interference fit, which also can prevent the socket signal conductors 2300 from falling off in a direction opposite to the assembly direction of the socket signal conductors 2300. By such a design, it is beneficial to ensure that the socket grounding conductor 2600 will not fall off from the upper socket housing 2100 in a long-term vibration environment or when subjected to a mechanical shock, or when the temperature changes.

Figure 7:
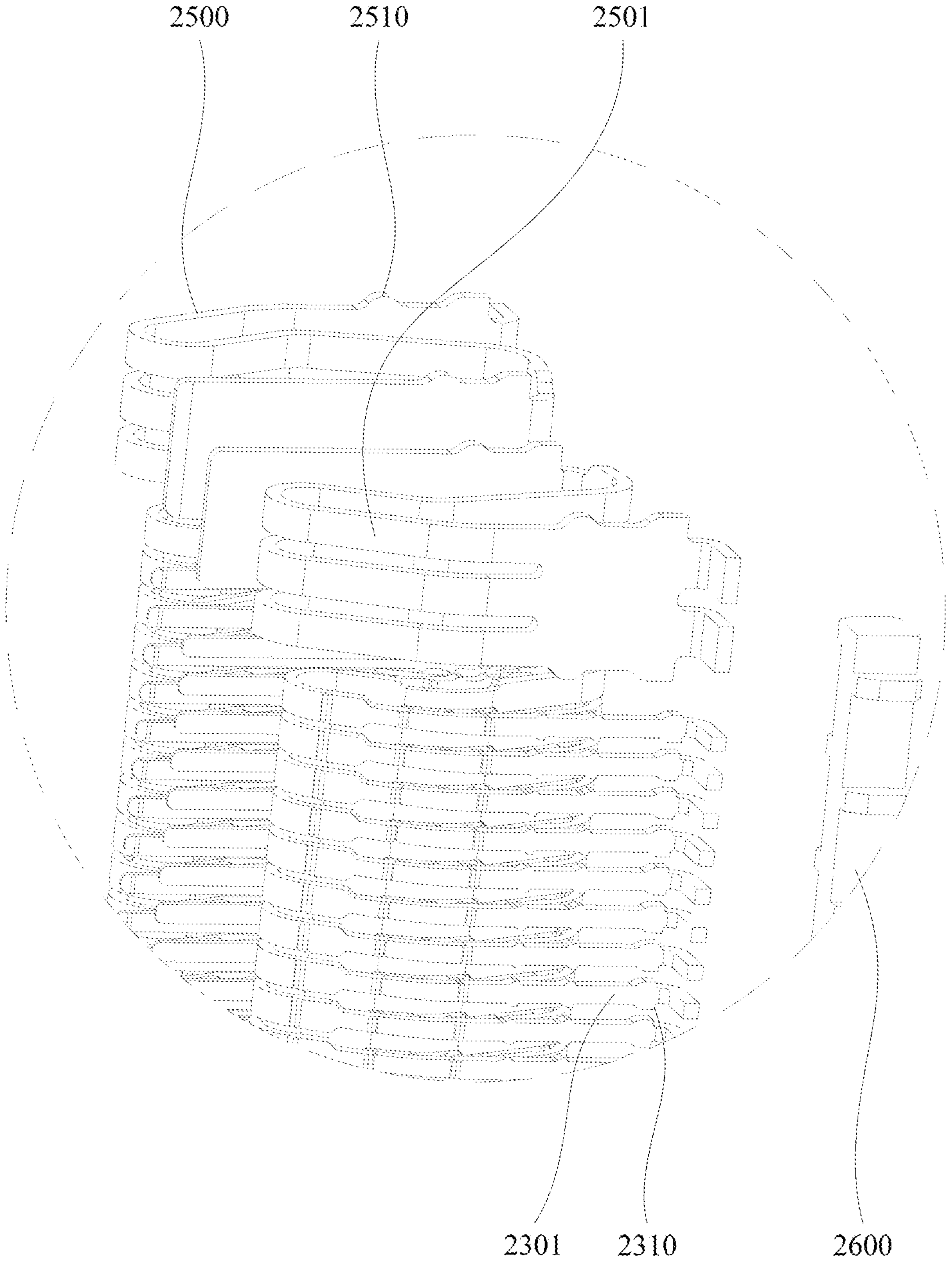
FIG. 7 is an enlarged schematic diagram of a portion of the structure of the socket connector shown in FIG. 6
Figure 10:
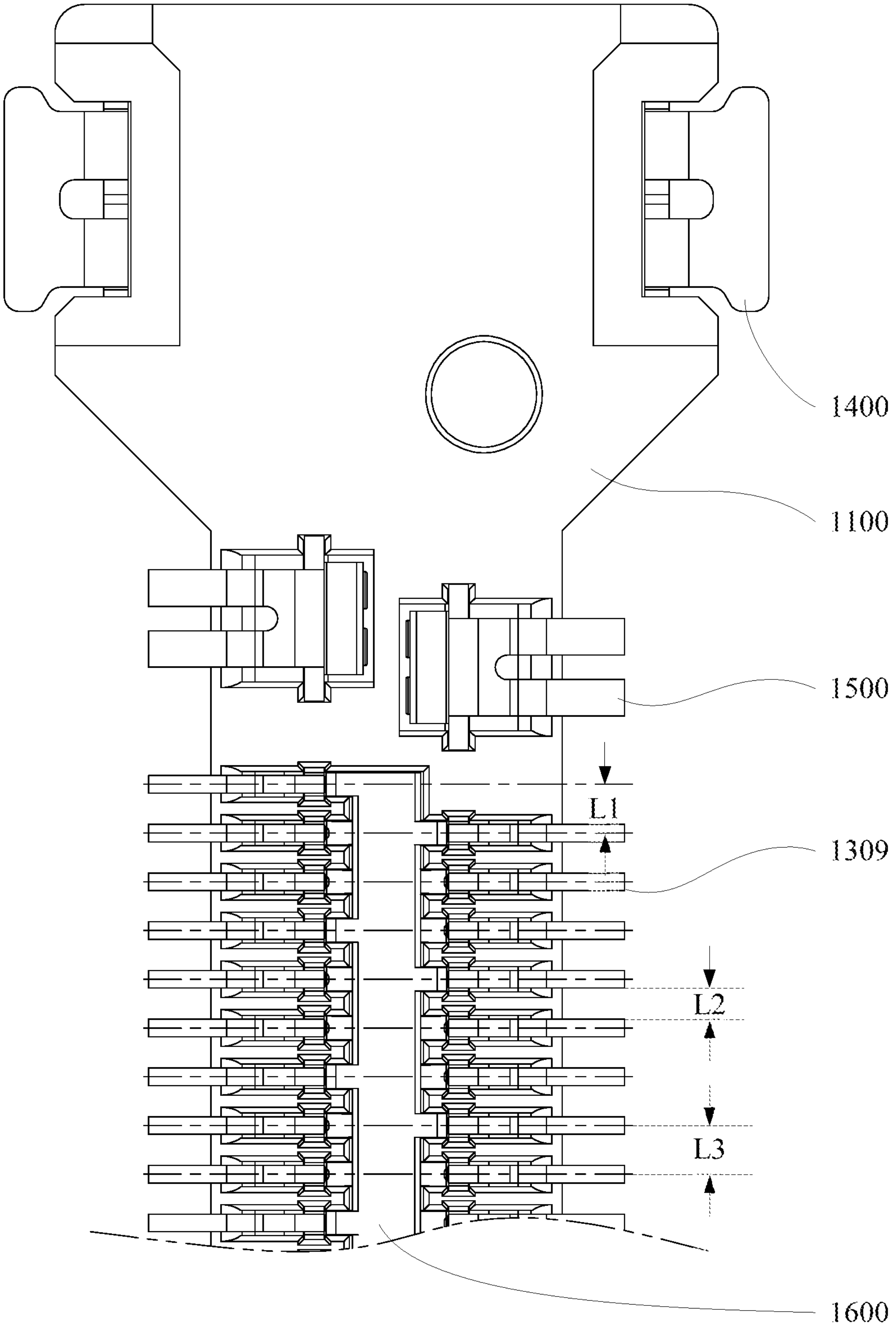
FIG. 10 is a schematic diagram showing two sets of plug signal conductors shown in FIG. 9 arranged in a misaligned manner.

With reference to FIG. 3, FIG. 7, and FIG. 10, it can be seen that each set of the socket power conductor 2500 includes at least two socket power conductor structures 2501. Each socket power conductor structure 2501 includes at least one socket power mounting interference portion 2510. The socket conductor structures including the socket signal conductor structures 2301 and the socket power conductor structures 2501 are each provided with a middle bending portion, and the middle bending portions are bent toward a plug signal conductor structure 1309 or a plug power conductor 1500 of the plug connector 1000. With reference to FIGS. 4, FIG. 5, and FIG. 7, it can be seen that, for each socket signal conductor structure 2301 in each set of the socket signal conductor 2300, every third socket signal conductor structure 2301 is connected to the socket grounding conductor 2600.

Figure 8:
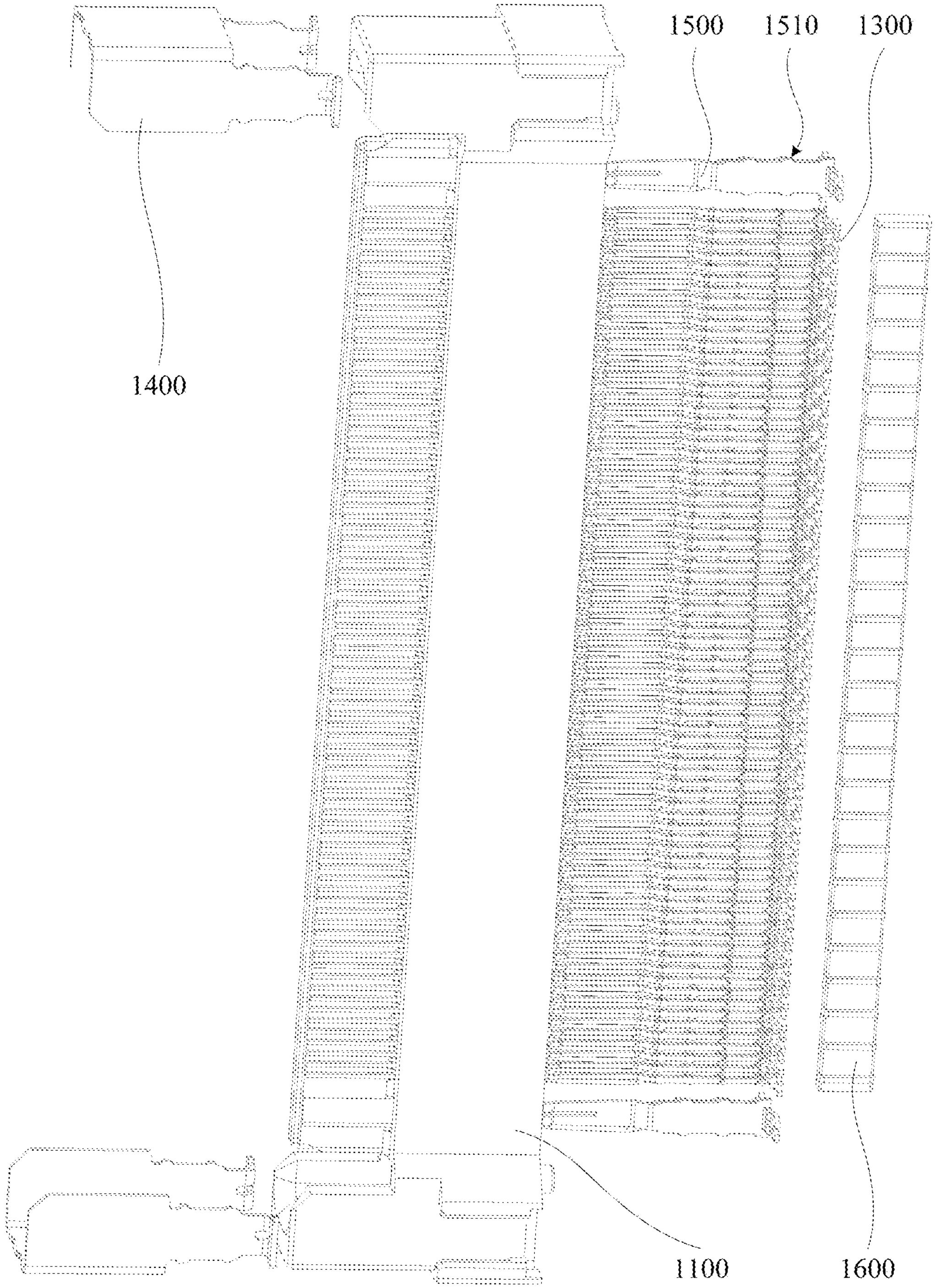
FIG. 8 is an exploded schematic diagram of a structural of a plug connector of the electrical connector shown in FIG. 1.
Figure 9:
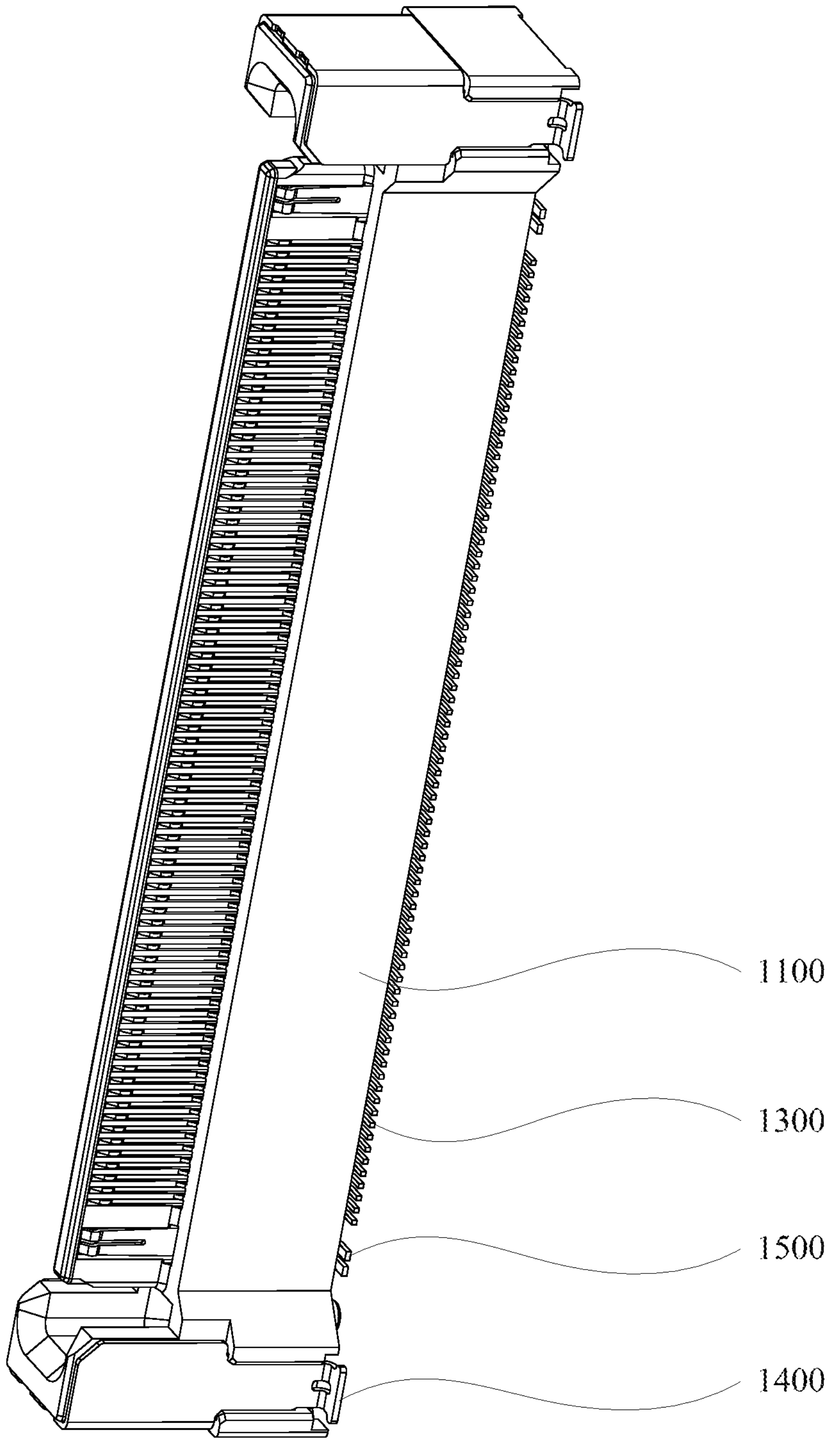
FIG. 9 is a schematic diagram showing an assembly of the electrical connector shown in FIG. 8.

As shown in FIG. 8 and FIG. 9, the plug connector includes a plug housing 1100, a plug grounding conductor 1600, two plug welding reinforcement legs 1400, two sets of plug signal conductors 1300 and two sets of plug power conductors 1500. Also referring to FIG. 10, the two sets of the plug signal conductors 1300 are arranged opposite each other and in a misaligned manner, and the two sets of the plug power conductors 1500 are also arranged opposite each other and in a misaligned manner. The first plug signal conductor structure 1309 of one set of plug signal conductor 1300 faces the second plug signal conductor structure 1309 of the other set of plug signal conductor 1300. The plug connector 1000 includes the plug welding reinforcement legs 1400, and the plug welding reinforcement legs 1400 are detachably disposed on the plug housing 1100. Also referring to FIG. 10, every third plug signal conductor structure of each plug signal conductor 1300 is connected to the plug grounding conductor 1600. Furthermore, in the two sets of the plug signal conductors 1300 arranged in the misaligned manner, along an extension direction of the plug grounding conductor 1600, a misalignment distance L1 between the first plug signal conductor structure 1309 of one set of the plug signal conductor 1300 and the first plug signal conductor structure 1309 of the other set of the plug signal conductor 1300 is greater than or equal to a spacing L2 or a center-to-center spacing L3 of the plug signal conductor structures 1309 in the same set. Similarly, in the two sets of the socket signal conductors 2300 that are arranged in the misaligned manner, along the extension direction of the socket grounding conductor 2600, a misaligned distance L1 between the first socket signal conductor structure 2301 of one set of the plug signal conductor 2300 and the first socket signal conductor structure 2301 of the other set of the socket signal conductor 2300 is greater than or equal to a spacing L2 or a center-to-center spacing L3 of the socket signal conductor structures 2301 is the same set.

Figure 11:
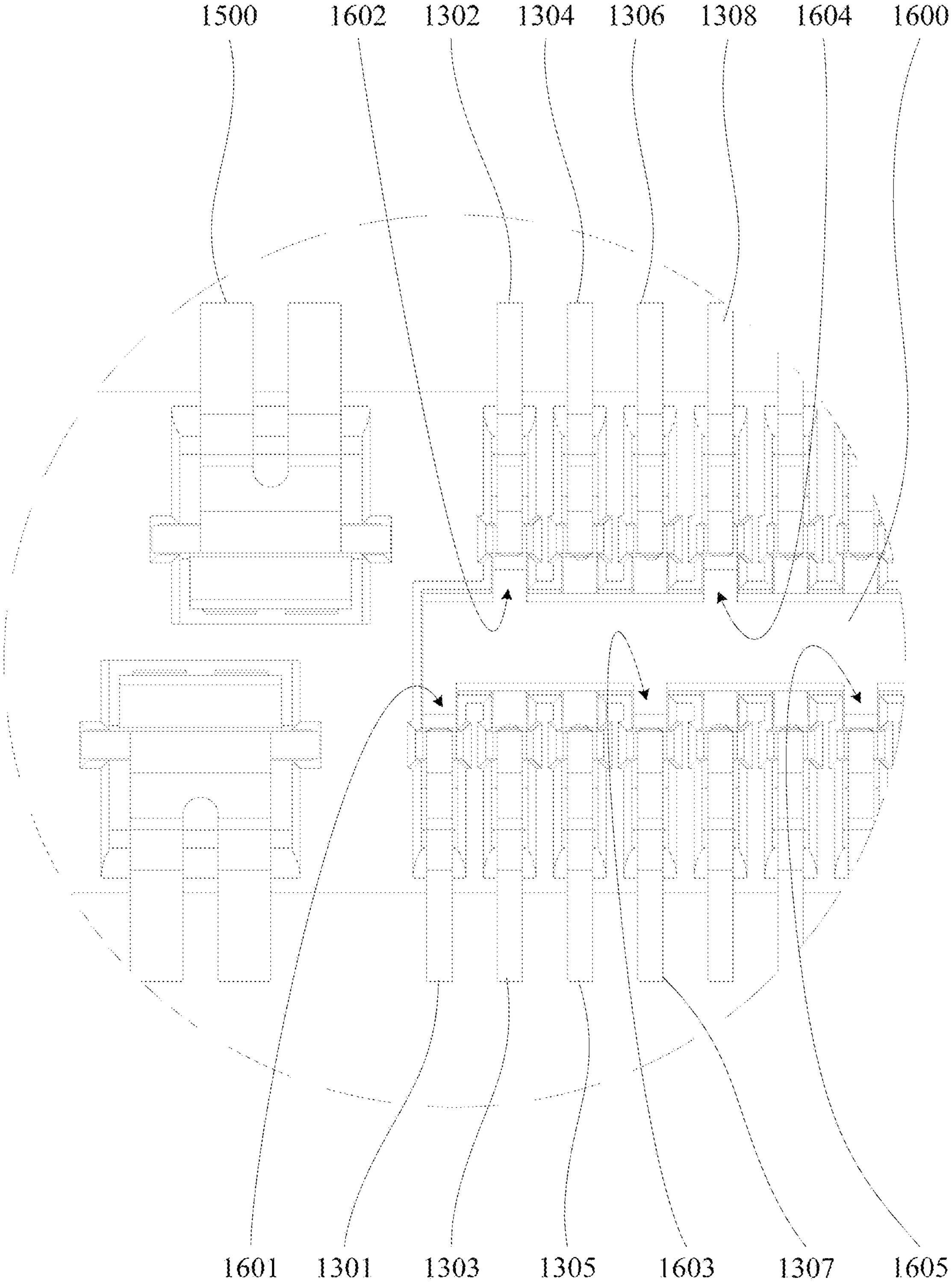
FIG. 11 is an enlarged schematic diagram of a portion of the structure shown in FIG. 10.

Specifically, the plug shell 1100 includes two rows of mounting holes for mounting the plug signal conductors 1300. The holes for mounting the plug signal conductors 1300 in each row are arranged at equal intervals. There exists a misalignment between the two rows of the mounting holes, and the misalignment has at least one PIN distance (i.e., the distance between adjacent plug signal conductor structures). The plug signal conductors 1300 are inserted into the plug housing 1100. The plug signal conductor structures in each set of the plug signal conductor 1300 are arranged at equal intervals. The two sets of the plug signal conductors 1300 each have an elastic deformation portion 1320 engaging a sliding insertion portion of each set of the socket signal conductor 2300 of the socket connector 2000, and the elastic deformation portion 1320 extends toward the outer side of the plug connector. Each plug signal conductor 1300 includes at least one clamping point, i.e., the plug signal conductor interference portion 1390. Each plug power conductor 1500 includes at least one plug power conductor interference portion 1510. Each plug signal conductor interference portion 1390 and each plug power conductor interference portion 1510 have at least one variation in width or thickness, the variation area is called a clamping point area, and the clamping point area and the plug housing 1100 form a hard interference therebetween. The plug power conductors 1500 are inserted into the plug housing 1100. The spacing between the plug power conductors 1500 and the plug signal conductors 1300 and the spacing between the plug power conductors are set according to the amount of transmitted current and the voltage of the plug, and there is no special limitation to the setting of the spacing in the embodiments of the present application. The plug grounding conductor 1600 is utilized to interconnect the plug signal conductors (i.e., the plug signal conductor structures 1309) in the plug connector that performs grounding function in an arrangement mode of Ground-Signal-Signal-Ground-Signal-Signal-Ground. The plug grounding conductor 1600 and the conductive portions of the plug signal conductors 1300 are misaligned by at least one spacing of the plug signal conductor structures (i.e., misaligned by at least one 1 PIN distance). The conduction portions may be referred to as plug grounding ends, and for example, the plug grounding ends are periodically arranged every several fixed PIN distance (there is one PIN distance between two adjacent socket signal conductor structures). As shown in FIG. 11, the first plug grounding end 1601 and the third plug grounding end 1603 of the plug grounding conductor 1600 are spaced two PINs apart.

Also referring to FIG. 11, one set of the plug signal conductor 1300 includes regularly arranged plug signal conductor structures such as a first plug signal conductor structure 1301, a third plug signal conductor structure 1303, a fifth plug signal conductor structure 1305 and a seventh plug signal conductor structure 1307, etc. The other set of the plug signal conductor 1300 includes regularly arranged plug signal conductor structures such as a second plug signal conductor structure 1302, a fourth plug signal conductor structure 1304, a sixth plug signal conductor structure 1306 and an eighth plug signal conductor structure 1308, etc. Also referring to FIG. 12 and FIG. 13, the plug grounding conductor 1600 includes a first plug grounding end 1601, a second plug grounding end 1602, a third plug grounding end 1603, a fourth plug grounding end 1604 and a fifth plug grounding end 1605, etc. The first plug grounding end 1601, the third plug grounding end 1603, the fifth plug grounding end 1605 and other plug grounding ends are regularly arranged to form one row, and the second plug grounding end 1602, the fourth plug grounding end 1604 and other plug grounding ends are regularly arranged to form the other row. The first plug signal conductor structure 1301, acting as a grounding end, is connected to the first plug grounding end 1601, then two plug signal conductor structures are skipped, i.e., the third plug signal conductor structure 1303 and the fifth plug signal conductor structure 1305 are not grounded, and the seventh plug signal conductor structure 1307, acting as a grounding end, is connected to the third plug grounding end 1603, and so on. The second plug signal conductor structure 1302 and the first plug signal conductor structure 1301 are arranged opposite each other and in the misaligned manner. The second plug signal conductor structure 1302, acting as a grounding end, is connected to the second plug grounding end 1602, then two plug signal conductor structures are skipped, i.e., the fourth plug signal conductor structure 1304 and the sixth plug signal conductor structure 1306 are not grounded, and the eighth plug signal conductor structure 1308, acting as a grounding end, is connected to the fourth plug grounding end 1604, and so on.

As seen in the above drawings, the two sets of the socket signal conductors 2300 are arranged in the misaligned manner. Each set of the socket signal conductor 2300 includes a plurality of socket signal conductor structures 2301. Each socket signal conductor structure 2301 includes at least one socket signal mounting interference portion 2310, and each socket power conductor structure 2501 includes at least one socket power mounting interference portion 2510. The lower socket housing 2200 is snap-mounted onto each socket signal mounting interference portion 2310 and each socket power mounting interference portion 2510. The socket grounding conductor 2600 is fixed onto the lower socket housing 2200, and is connected to part of the socket signal conductor structures 2301 in each set of the socket signal conductor 2300. The upper socket housing 2100 is mounted to the lower socket housing 2200 through an insertion connection (e.g., a snap connection). The two sets of the plug signal conductors 1300 of the plug connector 1000 are also arranged in the misaligned manner, and the plug signal conductor structures 1309 in the two sets of the plug signal conductors 1300 and the socket signal conductor structures 2301 in the two sets of the socket signal conductors 2300 are in one-to-one correspondence to achieve the electrical contact when the plug connector 1000 is connected to the socket connector 2000.

The two sets of the plug power conductors 1500 closely abut against the two sets of the socket power conductors 2500, respectively. Similarly, the two sets of the plug signal conductors 1300 closely abut against the two sets of the socket signal conductors 2300, respectively. The plug housing 1100 is connected to the upper socket housing 2100 through the contact (or called plugging or clamping) of the two sets of the plug power conductors 1500 and the two sets of the plug signal conductors 1300 with the two sets of the socket power conductors 2500 and the two sets of the socket signal conductors 2300, respectively. The upper socket housing 2100 is also connected to the lower socket housing 2200 through the two sets of the socket signal conductors 2300 and the two sets of the socket power conductors 2500. Therefore, the position of the upper socket housing 2100 relative to the plug housing 1100 is relatively fixed due to the close contact between the conductors. However, the middle bending portions of the socket signal conductor structures 2301 and the socket power conductor structures 2501 are not fixed and can move in a certain degree in the application environment, therefore, the lower socket housing 2200 is floating relative to the upper socket housing 2100, and it can also be understood that the lower socket housing 2200 is movable relative to the upper socket housing 2100 within a certain range of position. Therefore, it can be understood that the plug connector 1000 and the socket connector 2000 are connected in a floating and detachable manner.

Figure 12:
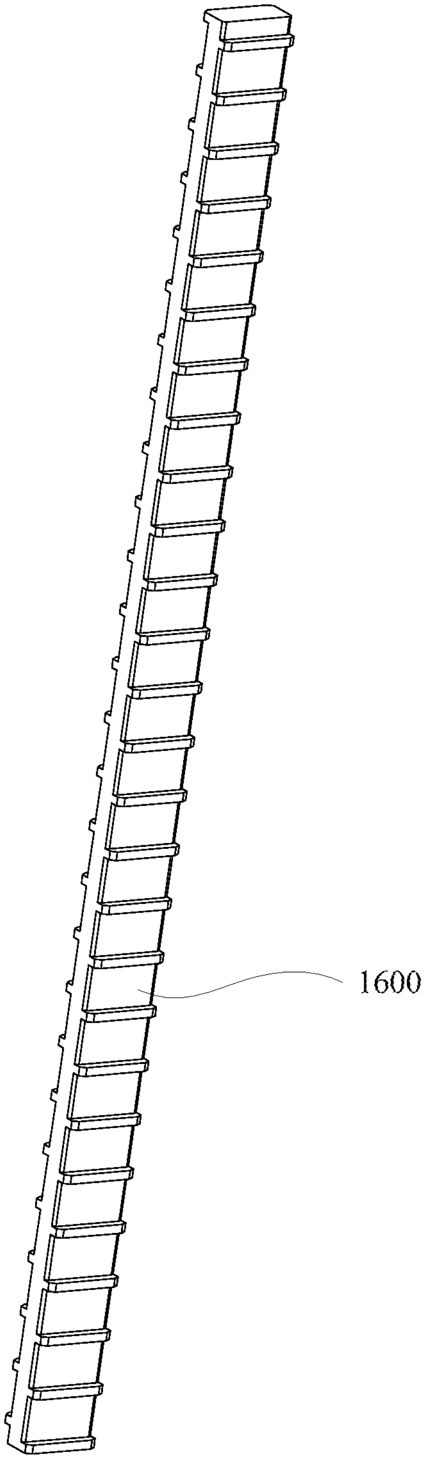
FIG. 12 is a schematic diagram of a structure of a plug grounding conductor shown in FIG. 9.
Figure 13:
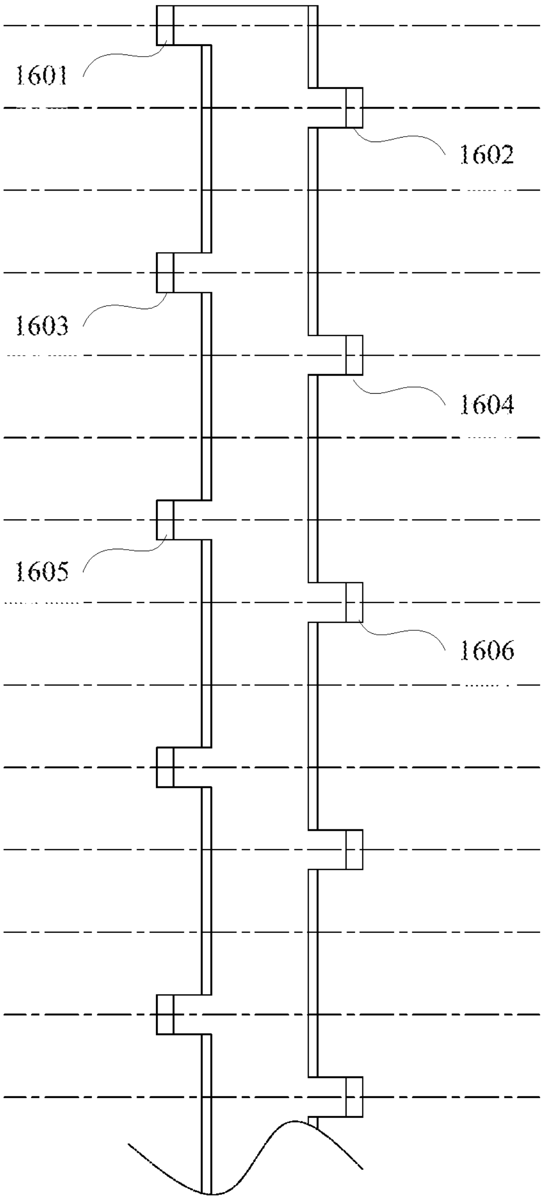
FIG. 13 is an enlarged schematic diagram of a portion of the structure of the plug grounding conductor shown in FIG. 12
Figure 14:
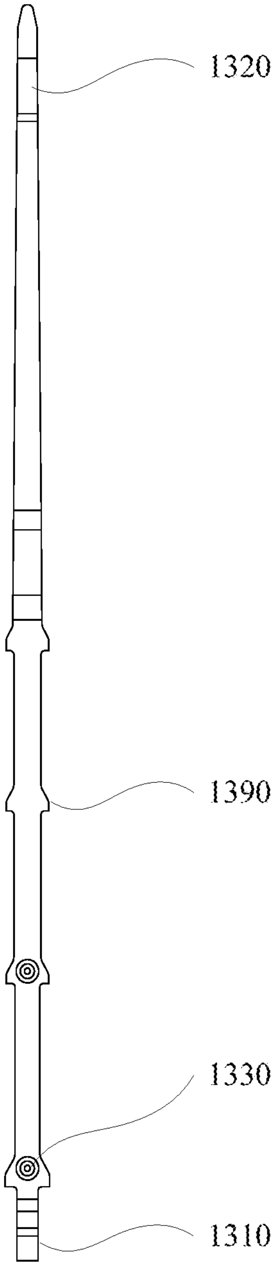
FIG. 14 is a schematic diagram of a structure of a plug signal conductor of a plug connector shown in FIG. 1.

Referring to FIG. 9, FIG. 12 and FIG. 14, each plug signal conductor structure 1309 includes at least one plug signal conductor interference portion 1390. Each plug power conductor 1500 includes at least one plug power conductor interference position 1510. The plug housing 1100 is snap-mounted to each plug signal conductor interference portion 1390 and each plug power conductor interference portion 1510. The plug grounding conductor 1600 is fixed on the plug housing 1100 and connected to part of the plug signal conductor structures 1309 of the plug signal conductors 1300 in each set.

Figure 15:
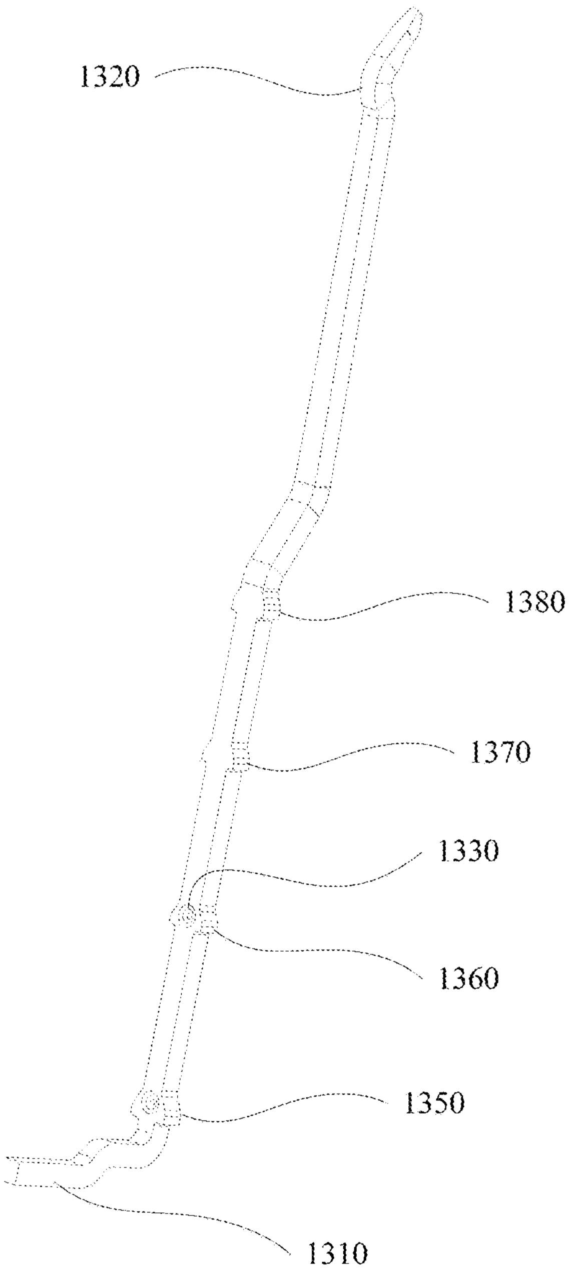
FIG. 15 is a schematic diagram of the plug signal conductor shown in FIG. 14 in another direction.
Figure 16:
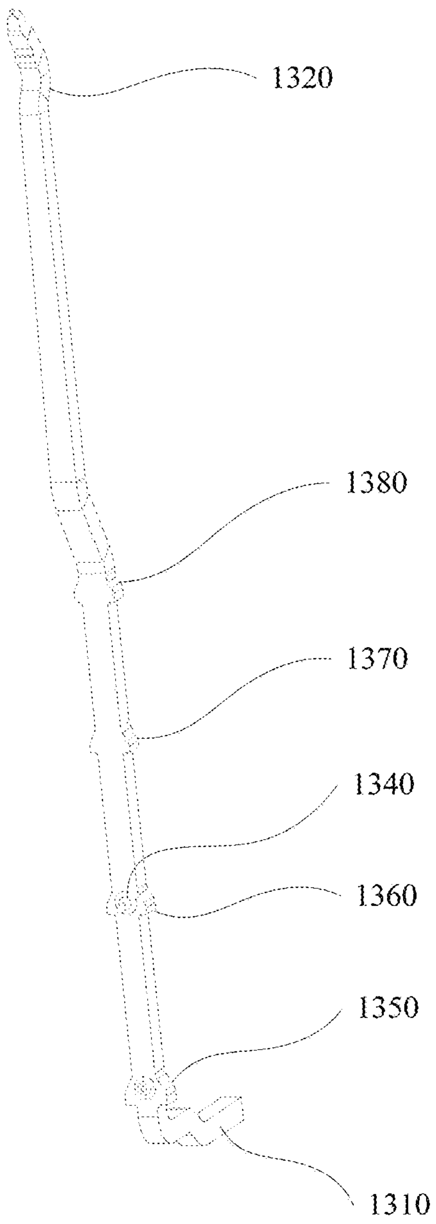
FIG. 16 is a schematic diagram of the plug signal conductor shown in FIG. 14 in the other direction.

Also referring to FIG. 15 and FIG. 16, the plug signal conductor structure 1309 includes a signal conductor welding leg portion 1310, an elastic deformation portion 1320, and a signal conductor positioning protrusion 1340 located between the signal conductor welding leg portion 1310 and the elastic deformation portion 1320. In this embodiment, a signal conductor positioning hole 1330 is also provided corresponding to the signal conductor positioning protrusion 1340. The elastic deformation portion 1302 is configured to elastically abut against the corresponding socket signal conductor structure 2301 to achieve an electrical contact when the plug connector 1000 is connected to the socket connector 2000. The signal conductor positioning protrusion 1340 is configured to abut against a plug grounding end of the plug grounding conductor 1600 or the plug housing 1100. In this embodiment, the plug signal conductor structure 1309 includes at least one width or thickness adjusting portion at a position adjacent to or away from the plug signal conductor interference portion 1390. The plug signal conductor structure 1309 is also provided with a signal conductor first interference portion 1350, a signal conductor second interference portion 1360, a signal conductor third interference portion 1370 and a signal conductor fourth interference portion 1380 to cooperatively mount and fix the plug housing 1100.

In one of the embodiments, an in-vehicle electronic device including the electrical connector as described in any of the embodiments is provided. In one of the embodiments, the in-vehicle electronic device includes a navigator, an audio player, a video player, an air regulator, and a monitoring device, etc. In one of the embodiments, the electrical connector is used at a position where a floating board-to-board connection is required by the in-vehicle electronic device.

Furthermore, as seen in the above description, the socket connector creatively utilizes a socket conductor shape with an R-shaped bend, and the welding leg portions of the socket conductors are welded on the circuit board. The lower socket housing is mounted on the clamping point interference portions that are close to the welding legs of the socket conductors. The lower socket housing is fixed to the socket conductors and thus fixed to the circuit board by means of the reinforcement welding legs mounted on both ends of the lower socket housing. When the centerlines of the plug connector and the socket connector are deviated and the two connectors are engaged, since the socket conductors each have the R-shaped bending portion, the R-shaped bending portions can be deformed to absorb assembly dimensional errors and stresses. In addition, since the R-shaped bending portion has multiple positions that can be deformed dispersedly, the socket conductor can disperse a total deformation to its multiple positions more evenly, which can effectively reduce the magnitude of the change in conductor characteristic impedance when the socket conductor is deformed, and achieve better high-speed data transmission performance. Furthermore, the socket conductors of the socket connector and the plug conductors of the plug connector each have at least one variation in the thickness or width, which not only can achieve an optimization of the conductor mechanical properties, but also achieve an optimization of the signal completeness of the conductor signal transmission, ensuring that the electrical performance of the electrical connector is in a controllable state in a large mounting tolerance state. Moreover, in the conductor arrangement, the two rows of the side-by-side conductors are creatively arranged in the misaligned manner, with at least one PIN distance, on the socket connector and the plug connector, and at least one additional grounding conductor is utilized between the two rows of the conductors to interconnect all the conductors for shielding and grounding out of the two rows of conductors, and therefore, the crosstalk between shoulder-to-shoulder and face-to-face differential pairs in the electrical connector can be reduced, ensuring that the electrical performance of the electrical connectors is in a controllable state in a large mounting tolerance state.

In actual tests, the electrical connector can achieve a reliable connection in application environment with large mounting errors and in harsh scenarios including high vibration environment, high temperature environment, etc., and also has the ability to transmit signals at 10 Gbps and above. In addition, based on the signal transmission, the electrical connector can transmit larger current by designing the socket conductor.

It should be noted that other embodiments of the present application also include electrical connectors and in-vehicle electronic devices formed by the technical features of the above-mentioned embodiments and capable of being implemented.

The technical features in the above embodiments may be randomly combined. In order to make the description concise, not all possible combinations of the technical features in the above embodiments are described. However, all the combinations of the technical features should be considered as falling within the scope described in this specification as long as there is no contradiction. The above-mentioned embodiments only illustrate several embodiments of the present disclosure, and the descriptions thereof are relatively specific and detailed, but should not be construed as a limitation on the scope of the patent of the present disclosure. It should be noted that for those skilled in the art, without departing from the concept of the present disclosure, several modifications and improvements can be made, which all fall within the protection scope of the present disclosure. Therefore, the scope of protection of the present disclosure shall be subject to the appended claims.

What is claimed is:

1. An electrical connector comprising a plug connector and a socket connector which are connected in a floating and detachable manner, the socket connector comprising an upper socket housing, a lower socket housing, a socket grounding conductor, two sets of socket signal conductors and two sets of socket power conductors, the two sets of the socket signal conductors being arranged in a misaligned manner, each set of the socket signal conductor comprising a plurality of socket signal conductor structures, each socket signal conductor structure comprising at least one socket signal mounting interference portion, each socket power conductor comprising at least one socket power mounting interference portion, the lower socket housing being snap-mounted onto each of the socket signal mounting interference portions and each of the socket power mounting interference portions, wherein each socket signal conductor structure further comprises a R-shaped middle bending portion, the R-shaped middle bending portion comprises a back-bending structure and a bending structure, and the back-bending structure and the bending structure are located in different planes, the socket grounding conductor being fixed onto the lower socket housing and connected to part of the socket signal conductor structures of each set of the socket signal conductor, the upper socket housing being mounted onto the lower socket housing through an insertion connection, and two sets of plug signal conductors of the plug connector being also arranged in a misaligned manner, and the plug signal conductor structures of the two sets of the plug signal conductors and the socket signal conductor structures of the two sets of the socket signal conductors being in one-to-one correspondence for achieving an electrical contact when the plug connector is connected to the socket connector.

2. The electrical connector according to claim 1, wherein the socket connector further comprises two socket welding reinforcement legs, the socket welding reinforcement legs are provided at two ends of the lower socket housing respectively, and the socket welding reinforcement legs fixedly snap to the upper socket housing.

3. The electrical connector according to claim 1, wherein in the two sets of the socket signal conductors being arranged in the misaligned manner, along an extension direction of the socket grounding conductor, a misalignment distance L1 between the first socket signal conductor structure in one set of the socket signal conductor and the first socket signal conductor structure in the other set of the socket signal conductor is greater than or equal to a spacing L2 or a center-to-center spacing L3 of the socket signal conductor structures in a same set.

4. The electrical connector according to claim 1, wherein, for the socket signal conductor structures in each set of the socket signal conductor, every third socket signal conductor structure is connected to the socket grounding conductor.

5. The electrical connector according to claim 1, wherein each set of the socket power conductor comprises at least two socket power conductor structures, and each of the socket power conductor structures comprises at least one socket power mounting interference portion, the socket signal conductor structures and the socket power conductor structures each comprise a middle bending portion, and the middle bending portion is bent toward a plug signal conductor structure or a plug power conductor of the plug connector.

6. The electrical connector according to claim 5, wherein the socket signal conductor structures and the socket power conductor structures each comprise:

a welding leg portion for welding to an external circuit board, the R-shaped middle bending portion, and a sliding insertion portion for conducting with the plug connector.

7. The electrical connector according to claim 6, wherein the middle bending portion is floated in an internal space enclosed by the upper socket housing and the lower socket housing.

8. The electrical connector according to claim 1, wherein the plug connector further comprises a plug housing, a plug grounding conductor, and two sets of plug power conductors, each of the plug signal conductor structures comprising at least one plug signal conductor interference portion, each of the plug power conductor comprising at least one plug power conductor interference portion, the plug housing being snap-mounted onto each of the plug signal conductor interference portions and each of the plug power conductor interference portions, and the plug grounding conductor being fixed onto the plug housing and is connected to part of the plug signal conductor structures in each set of the plug signal conductor.

9. The electrical connector according to claim 8, wherein the plug connector further comprises with plug welding reinforcement legs, and the plug welding reinforcement legs are detachably arranged on the plug housing.

10. The electrical connector according to claim 8, wherein the plug signal conductor structure comprises at least one width or thickness adjusting portion adjacent to or away from the plug signal conductor interference portion.

11. The electrical connector according to claim 8, wherein the socket signal conductor structure comprises at least one width or thickness adjusting portion adjacent to or away from the socket signal mounting interference portion.

12. The electrical connector according to claim 8, wherein the plug signal conductor structure comprises a signal conductor welding leg portion, an elastic deformation portion, and a signal conductor positioning protrusion located between the signal conductor welding leg portion and the elastic deformation portion, the elastic deformation portion is configured to elastically abut against a corresponding socket signal conductor structure when the plug connector is connected to the socket connector to achieve the electrical contact, and the signal conductor positioning protrusion is configured to abut against a plug grounding end of the plug grounding conductor or the plug housing.

13. The electrical connector according to claim 12, wherein the plug signal conductor structure further comprises a first signal conductor interference portion, a signal conductor second interference portion, a signal conductor third interference portion, and a signal conductor fourth interference portion to cooperatively mount and fix the plug housing.

14. The electrical connector according to claim 8, wherein the two sets of the plug power conductors respectively abut against the two sets of the socket power conductors, and the two sets of the plug signal conductors respectively abut against the two sets of the socket signal conductors.

15. An in-vehicle electronic device, comprising an electrical connector, the electrical connector comprising a plug connector and a socket connector which are connected in a floating and detachable manner, the socket connector comprising an upper socket housing, a lower socket housing, a socket grounding conductor, two sets of socket signal conductors and two sets of socket power conductors, the two sets of the socket signal conductors being arranged in a misaligned manner, each set of the socket signal conductor comprising a plurality of socket signal conductor structures, each socket signal conductor structure comprising at least one socket signal mounting interference portion, each socket power conductor comprising at least one socket power mounting interference portion, the lower socket housing being snap-mounted onto each of the socket signal mounting interference portions and each of the socket power mounting interference portions, wherein each socket signal conductor structure further comprises a R-shaped middle bending portion, the R-shaped middle bending portion comprises a back-bending structure and a bending structure, and the back-bending structure and the bending structure are located in different planes, the socket grounding conductor being fixed onto the lower socket housing and connected to part of the socket signal conductor structures of each set of the socket signal conductor, the upper socket housing being mounted onto the lower socket housing through an insertion connection, and two sets of plug signal conductors of the plug connector being also arranged in a misaligned manner, and the plug signal conductor structures of the two sets of the plug signal conductors and the socket signal conductor structures of the two sets of the socket signal conductors being in one-to-one correspondence for achieving an electrical contact when the plug connector is connected to the socket connector.

16. The in-vehicle electronic device according to claim 15, wherein the socket connector further comprises two socket welding reinforcement legs, the socket welding reinforcement legs are provided at two ends of the lower socket housing respectively, and the socket welding reinforcement legs fixedly snap to the upper socket housing.

17. The in-vehicle electronic device according to claim 15, wherein each set of the socket power conductor comprises at least two socket power conductor structures, and each of the socket power conductor structures comprises at least one socket power mounting interference portion;

the socket signal conductor structures and the socket power conductor structures each comprise a middle bending portion, and the middle bending portion is bent toward a plug signal conductor structure or a plug power conductor of the plug connector.

18. The in-vehicle electronic device according to claim 17, wherein each socket conductor structure comprises a welding leg portion for welding to an external circuit board, the middle bending portion has an R shape, and a sliding insertion portion for conducting with the plug connector.

19. The in-vehicle electronic device according to claim 18, wherein the middle bending portion is floated in an internal space enclosed by the upper socket housing and the lower socket housing.

20. The in-vehicle electronic device according to claim 15, wherein the plug connector further comprises a plug housing, a plug grounding conductor, and two sets of plug power conductors;

each of the plug signal conductor structures comprising at least one plug signal conductor interference portion, each of the plug power conductor comprising at least one plug power conductor interference portion, the plug housing being snap-mounted onto each of the plug signal conductor interference portions and each of the plug power conductor interference portions, and the plug grounding conductor being fixed onto the plug housing and is connected to part of the plug signal conductor structures in each set of the plug signal conductor.

* * * * *